(12) United States Patent
Schlusser et al.

(10) Patent No.: US 8,533,313 B2
(45) Date of Patent: *Sep. 10, 2013

(54) SYSTEMS, METHODS, AND COMPUTER READABLE MEDIA FOR PROVIDING APPLICATIONS STYLE FUNCTIONALITY TO A USER

(75) Inventors: Paul Schlusser, Collaroy (AU); Dave Turner, Harbord (AU)

(73) Assignee: Binu Pty Ltd, Belrose, NSW (AU)

( * ) Notice: Subject to any disclaimer, the term of this patent is extended or adjusted under 35 U.S.C. 154(b) by 70 days.

This patent is subject to a terminal disclaimer.

(21) Appl. No.: 13/122,250

(22) PCT Filed: Sep. 30, 2009

(86) PCT No.: PCT/AU2009/001298
§ 371 (c)(1),
(2), (4) Date: Jul. 26, 2011

(87) PCT Pub. No.: WO2010/037168
PCT Pub. Date: Apr. 8, 2010

(65) Prior Publication Data
US 2011/0270959 A1    Nov. 3, 2011

Related U.S. Application Data

(60) Provisional application No. 61/136,763, filed on Oct. 1, 2008.

(51) Int. Cl.
*G06F 15/173* (2006.01)
(52) U.S. Cl.
USPC .......................................... 709/223; 370/254
(58) Field of Classification Search
USPC ............ 370/252, 254; 340/1.1–16.1; 714/39
See application file for complete search history.

(56) References Cited

U.S. PATENT DOCUMENTS

| | | |
|---|---|---|
| 5,832,231 A | 11/1998 | Raman et al. |
| 6,085,226 A | 7/2000 | Horvitz |
| 6,182,133 B1 | 1/2001 | Horvitz |
| 6,397,259 B1 * | 5/2002 | Lincke et al. ................. 709/236 |
| 6,584,548 B1 | 6/2003 | Bourne et al. |
| 6,594,348 B1 * | 7/2003 | Bjurstrom et al. ......... 379/88.13 |
| 6,618,751 B1 | 9/2003 | Challenger et al. |
| 7,007,237 B1 | 2/2006 | Sharpe |

(Continued)

OTHER PUBLICATIONS

International Search Report for PCT/AU2009/001298 dated Nov. 29, 2009.

*Primary Examiner* — Kambiz Zand
*Assistant Examiner* — Gregory M Elmore
(74) *Attorney, Agent, or Firm* — Jones Day

(57) ABSTRACT

Systems, methods, and computer readable media of providing applications style functionality to a user of a mobile radio terminal are disclosed. In certain embodiments, the systems, methods, and computer readable media include the steps of receiving a data stream transmission having a plurality of states, wherein each state is associated with output instructions and storage instructions, and wherein the plurality of states is configured such that moving through the states creates the appearance of executing an application on the mobile radio terminal; decoding the data stream transmission and caching each of the plurality of states with the associated output instructions according to the associated storage instructions; rendering a first state; responsive to an event on the mobile radio terminal, moving from the first state to a second state by applying the output instructions associated with the second state; and communicating a change of state to a server.

13 Claims, 10 Drawing Sheets

(56) References Cited

U.S. PATENT DOCUMENTS 7,330,890 B1 2/2008 Partovi et al.
8,082,327 B2 * 12/2011 Schlusser .................. 709/219

2003/0046365 A1 3/2003 Pfister et al.
2006/0206589 A1 9/2006 Lentini et al.
2007/0198634 A1 * 8/2007 Knowles et al. .............. 709/203
2012/0290919 A1 * 11/2012 Melnyk et al. ................ 715/234

* cited by examiner

SYSTEMS, METHODS, AND COMPUTER READABLE MEDIA FOR PROVIDING APPLICATIONS STYLE FUNCTIONALITY TO A USER

CROSS-REFERENCE TO RELATED APPLICATIONS

This application is the National Phase application of International Application No. PCT/AU2009/001298, filed 30 Sep. 2009, which claims the benefit of priority from U.S. Provisional Application No. 61/136,763, filed 1 Oct. 2008, and which is further incorporated herein, in its entirety, by reference. This application is related to co-pending International Application No. PCT/AU2008/000466, filed 9 Oct. 2008, which is entitled "Systems Methods and Apparatuses for Providing Applications Style Functionality to a User." The disclosure of PCT/AU2008/000466 is also incorporated herein, in its entirety, by reference.

BACKGROUND

1. Field of the Disclosure

The present disclosure relates to a systems, methods and apparatuses that are configured to provide applications style functionality to a user. More particularly, the present disclosure relates to systems, methods, and computer readable media that may include a mobile device and/or a server configured to communicate with the mobile device to provide applications style functionality to the user of the mobile device.

2. Description of Related Art

There are several existing methods for implementing software applications on wireless devices. These methods include browser-based applications implemented in mark-up languages such as WML and cHTML, and also stand alone or thick client applications that are typically implemented in JAVA and execute the majority of the application functionality natively within the wireless device.

A browser-based application involves the implementation of an application server that delivers mark-up languages (e.g., HTML), which are then interpreted by a general purpose browser resident on a client device. Browser based applications are relatively easy to implement but generally offer very poor interactivity with the user because of the bandwidth limitations and latency associated with wireless links. While languages such as HTML are powerful and expressive, they do not make efficient use of the bandwidth between an application server and a browser. One reason for this inefficiency is that they are designed to be human readable and as such, are generally represented using alphabetic characters.

Browser based systems suffer from many limitations including significant complexity required to implement basic functionality and extreme slowness arising from the fact that each user input requires an entire page fetch from a server.

A thick client based application involves the implementation of a client program that is fully executed on a client device. JAVA is often used as the language to implement the client software because it is ubiquitously available on wireless devices. Thick client based applications are often augmented by services provided by a ground based server to mediate connectivity to data of interest.

Client based applications are typically much more interactive than browser based applications because code can be executed on the client device which does not involve the latency of the wireless link. However, the thick client approach requires a separate application to be implemented for each new item of functionality that must be either preloaded or downloaded prior to use. The need to preload the application considerably reduces the appeal and accessibility of this approach.

A combination of the above is also possible involving the use of a mark-up language in conjunction with a scripting language. This approach is seen typically as a combination of HTML and Javascript. The combination includes the advantages of both approaches but also includes the problems of both approaches.

The present inventors have observed that it would be desirable to provide systems, methods and apparatuses that are configured to provide applications style functionality to a user to overcome some of the disadvantages of prior art systems.

SUMMARY OF THE DISCLOSURE

Exemplary embodiments of the present disclosure are directed to systems, methods, and computer readable media that minimize the data that is transmitted from the server to the client. The reduction is delivered using a number of techniques, including: a common library of graphical elements that include the graphical representation of characters is maintained in a cache on the client, but managed by the server, and is used to minimize the retransmission of any item; the definition of any state on the client is defined in terms of references to the images in the cache; the definition of a state on the client can also be defined in terms of the graphical differences between it and another state already loaded on the client; changes to a page over time are determined by the server and only the differences between versions are transmitted to the client.

Certain embodiments of the present disclosure minimize the latency experienced by the user by pre-caching content or, when a page is not pre-cached, by transmitting only the content required to fill the display area of the client before the screen on the mobile device is updated.

In certain embodiments, content downloaded from the server by the proxy will have an effective lifetime before it expires and needs to be refreshed. States that represent an expired page will often be pre-loaded on the client and need to be updated. The system manages this aging of the cached data and the efficient communication of updates.

In certain embodiments, a server can include details in its response that allows the proxy to determine optimum methods to transmit pages to the client and to manage the expiry of pages.

In certain exemplary embodiments, a method of providing applications style functionality to a user of a mobile radio terminal includes the steps of receiving a data stream transmission having a plurality of states, wherein each state is associated with output instructions and storage instructions, and wherein the plurality of states is configured such that moving through the states creates the appearance of executing an application on the mobile radio terminal; decoding the data stream transmission and caching each of the plurality of states with the associated output instructions according to the associated storage instructions; rendering a first state; responsive to an event on the mobile radio terminal, moving from the first state to a second state by applying the output instructions associated with the second state; and communicating a change of state to a server.

In certain exemplary embodiments, a method of transmitting data to a mobile radio terminal includes the steps of interpreting the execution of an application such that the application can be expressed as a plurality of linked states through which a mobile radio terminal can navigate to create the appearance of executing the application; encoding a first data stream having ones of the plurality of linked states, wherein each state is associated with output instructions and storage instructions; transmitting the first data stream to at least one mobile radio terminal; and maintaining a record of the ones of the plurality of linked states that were transmitted to the at least one mobile radio terminal in the first data stream.

In certain exemplary embodiments, a method of transmitting data to a mobile radio terminal comprising the steps of providing a current impression having a first set of screen elements; building an index of a plurality of impressions, wherein each of the plurality of impressions includes a set of screen elements; selecting ones of the plurality of impressions that have a set of screen elements that are the most similar to the first set of screen elements of the current impression; comparing each set of screen elements of the selected impressions with the first set of screen elements to determine a best fit impression; generating a data transmission that comprises a set of differences between the best fit impression and the current impression; and transmitting the data transmission to a mobile radio terminal.

In certain exemplary embodiments, a method of transmitting data to a mobile radio terminal comprising the steps of storing a set of character images; providing the set of character images to a mobile radio terminal; generating a data transmission from a web page according to the set of character images such that the web page can be reconstructed from references to the set of character images; transmitting the data transmission to the mobile radio terminal.

In certain exemplary embodiments, a method of transmitting data to a mobile radio terminal comprising the steps of transmitting a first state to the mobile radio terminal, wherein the first state includes a state transition table; determining an order of transmission of a plurality of states based on the state transition table of the first state; transmitting a second state to the mobile radio terminal according to the order of transmission without receiving a request from the mobile radio terminal.

In certain exemplary embodiments, a method of transmitting data to a mobile radio terminal comprising the steps of determining a variability of each of a plurality of elements of a first screen in an application; identifying a first set of areas of the first screen that can be repeated across a plurality of other screens based on the variability of the plurality of elements of the first screen; transmitting data representing the first screen to at least one mobile radio terminal; and transmitting data representing the first set of areas of the first screen to at least one mobile radio terminal such that the at least one mobile radio terminal can reuse the first set of areas for other screens.

In certain exemplary embodiments, a method for managing changes to a screen over time so that transmitting of changes to a mobile radio terminal is minimized, the method comprising the steps of comparing a plurality of versions of a page to determine whether portions of the page have changed; comparing a plurality of defined non-static sections of the page to determine if at least one of the non-static sections of the page has changed; selecting ones of the plurality of defined non-static portions of the page that have changed; and transmitting the selected ones of the plurality of defined non-static portions of the page to at least one mobile radio terminal.

In certain exemplary embodiments, a method for managing content in a cache for transmission to a mobile radio terminal comprising the steps of defining related content in a cache, wherein the related content is expected to expire at the same time; defining expiry times of the related content in the cache; verifying a validity of the related content; removing the related content from the cache upon occurrence of the expiry time of the related content; and requesting updated content to replace the removed related content.

In certain exemplary embodiments, a method for creating a personalized experience for a client application based on a time and/or location of a user comprising the steps of determining a plurality of locations and times at which a user of a mobile radio terminal accesses a client application; generating a profile of the user's behavior and preferences based on the plurality of locations and times at which the user of the mobile radio terminal accesses the client application; modifying a display of the client application based on the profile of the user's behavior and preferences.

In certain exemplary embodiments, a method for prioritizing the transmission of content to a client device based on the time and location at which a user accesses a client application comprising the steps of determining a plurality of locations and times at which a user of a mobile radio terminal accesses a client application; generating a profile of the user's behavior and preferences based on the plurality of locations and times at which the user of the mobile radio terminal accesses the client application; modifying a display of the client application based on the profile of the user's behavior and preferences.

In certain exemplary embodiments, a method for transmitting multiple pages in smaller units from a server to a client application in response to a single request, the method comprising the steps of receiving a request for a plurality of pages; transmitting the request to a server; receiving the plurality of pages from the server; and generating a response including the plurality of pages, wherein the plurality of pages are separated into smaller units for transmission to a client device.

In certain exemplary embodiments, a method for a proxy to make a single request to a server to generate multiple pages wherein those pages are subsequently downloaded and cached by the proxy comprising the steps of receiving a request for a plurality of pages; transmitting the request to a server; receiving a data transmission from the server, said data transmission including ones of the plurality of pages from the server and instructions regarding retrieval of other ones of the plurality of pages; and generating a response including the ones of the plurality of pages, wherein the plurality of pages are separated into smaller units for transmission to a client device.

In certain exemplary embodiments, computer readable media and systems are disclosed for performing any of these methods.

BRIEF DESCRIPTION OF THE DRAWINGS

In order to facilitate a more detailed understanding of the nature of the inventions disclosed herein, exemplary embodiments of systems, methods and apparatuses that are configured to provide applications style functionality to a user will now be described in detail, by way of example only, with reference to the accompanying drawings in which.

DETAILED DESCRIPTION

Figure 1:
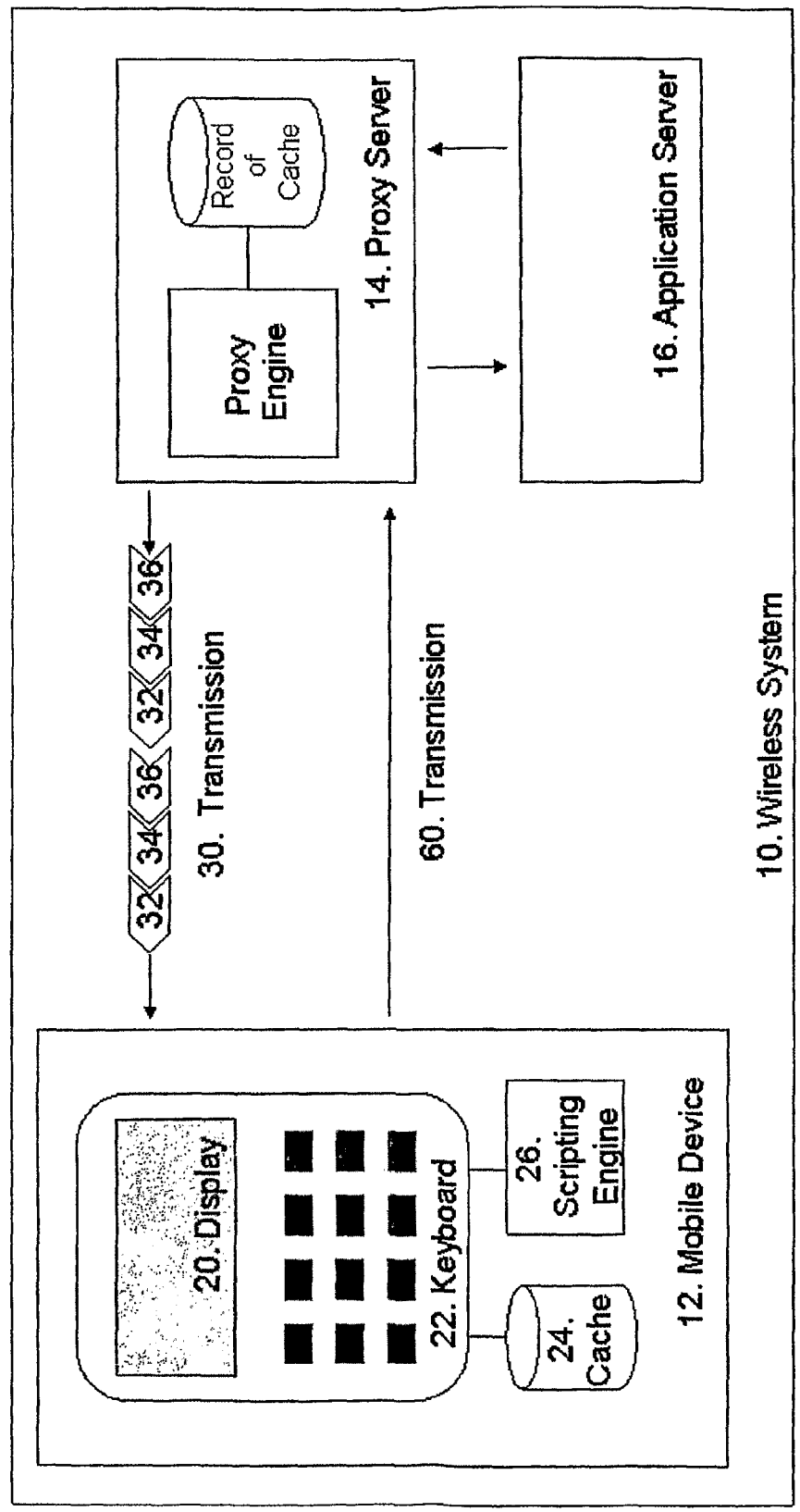
FIG. 1 is a schematic diagram of the elements of a wireless system in accordance with exemplary embodiments disclosed herein.

Certain embodiments of the present disclosure will now be described in detail, examples of which are illustrated in the accompanying drawings. The examples and embodiments are provided by way of explanation only and are not to be taken as limiting to the scope of the inventions. Furthermore, features illustrated or described as part of one embodiment may be used with one or more other embodiments to provide a further new combination. It will be understood that the present inventions will cover these variations and embodiments as well as variations and modifications that would be understood by the person skilled in the art.

The present disclosure relates to systems, methods and computer readable media that are configured to provide applications style functionality to a user. More particularly, the present disclosure relates to systems and apparatuses that may include a mobile device and/or a server configured to communicate with the mobile device to provide applications style functionality to the user of the mobile device. Details of certain embodiments disclosed herein are provided below with reference to FIGS. 1 and 2.

In exemplary embodiments, a wireless system comprising a user device (e.g., a mobile device) and a server (e.g., a proxy server) may be provided.

The user device may be configured to provide applications style functionality to a user. To achieve this, in exemplary embodiments, the user device may receive data comprising a series of linked states (e.g., screen pages) plus additional data (e.g., metadata) associated with each page. The metadata may include storage instructions and display instructions. The user device may decode the received data and cache each state and its corresponding display instructions in accordance with the storage instructions.

The server may be configured to communicate with the user device and with at least one applications server. The server receives data and markup instructions from more than one source, including from itself and encodes it. In particular, the server may be configured to interpret the execution of an application or rendering of a page and express it as a series of states through which the user device may navigate to create the appearance of executing an application or browsing web content. To achieve this, the server may encode the data so that the data comprises a series of linked display pages plus metadata associated with each page (e.g., storage instructions and display instructions). The server may transmit the encoded data stream for reception by a mobile device and maintain a record of the contents of the cache constructed in the user device after reception of the encoded data stream according to the storage instruction. Additionally, the server may receive the details of the changes in state on the user device, anticipate future states and encode the future states into subsequent data transmissions to the user device.

For example, in certain exemplary embodiments, a state may be a full HTML page and subsequent states may be pages to which the original page is linked (e.g., via a hypertext link). In addition, a state may be a small section of the original page and a subsequent state may be an adjacent area of the page or the page once a dropdown list has been expanded. Furthermore, a new state may be a complete new application or output of other media such as sound.

In certain exemplary embodiments the transmission from the server to the user device may be continuous while a channel is open, and when the channel is not otherwise busy the server may use the open channel to transmit a first generation of states linked to the last displayed state, together with their associated metadata. This transmission may be followed by the second generation of states linked to the first generation and so on.

In exemplary embodiments, a displayed state may contain items for user selection, and the selection of an item may result in the display of a corresponding new state to the user. In situations where the new page and its associated output instructions have already been received by the user device, there will be less delay in displaying the new state after selection. Transmission of user selections to the server may also be used to assist in maintaining synchronization between a cache in the user device and the record maintained at the server.

In exemplary embodiments, the proxy server may also separately transmit page element data that is common to a plurality of pages, together with associated metadata and display instructions, for instance font data for text. This data may be retrieved by appropriate pages as they are being constructed, for instance to generate the text for display on the page.

In exemplary embodiments, inputs by the user may be initiated via, for example, voice, touching the screen, movement of the device, instruction from another application, communication over a wireless network (e.g., Bluetooth), instructions from the server, keyboard input, etc.

In certain exemplary embodiment, a user device (e.g., a mobile device) for providing applications style functionality to a user may be configured to receive a data stream transmission, comprising a series of linked state conditions; respond to input or an event by moving the device to a new state by applying output instructions; notify a server of the change in state; and repeatedly move from one state to another to create the appearance of running an application; and decode the received data stream and cache each state and its output instructions in accordance with the storage instructions received with each state.

In certain exemplary embodiments, each state condition may contain output instructions (such as content to display on the screen) together with a list of new states that the device can move to in response to defined inputs or events.

In certain embodiments, the mobile device may be a mobile phone or a PDA.

In another exemplary embodiment a server (e.g., a proxy server) for communicating with the mobile device may be configured to interpret the execution of an application or rendering of a page and express it as a series of states through which the user device may navigate to create the appearance of executing an application or browsing web content; encode a data stream to comprise a series of linked states, plus metadata associated with each page (e.g., storage instructions and display instructions); transmit the encoded data stream for reception by a user device; and maintain a record of the contents of the cache constructed in the user device after reception of the encoded data stream according to the storage directions.

In exemplary embodiments, an area of memory on the mobile device may be dedicated to be managed by the server. The server may have complete control of this area of memory on the device. The data stream between the server and the device may include storage instructions to the mobile device regarding how to change this memory to record multiple states and other content. The mobile device may read the memory but may not make changes to the memory without instruction from the server. The server will retain a full copy of the controlled memory on the device. In addition, the server may retain a history of storage instructions built into the data stream such that if instructions to the device are lost they can be either re-transmitted or undone.

Referring to FIG. 1, the wireless system 10 comprises a mobile device 12, a proxy server 14 and an applications server 16. The mobile device 12 has a display 20 for the user to read, and a keypad 22 for the user to make entries. Internally the mobile device 12 has a cache 24 in which it stores the code received from the proxy server 14. The mobile device may also have a scripting engine 26 capable of executing scripting code.

The proxy server 14 receives applications transmissions from the applications server 16 in a mark-up language. The received applications functionality is divided into a first part for execution by the proxy server. A second part of the applications functionality is encoded into scripting code for execution by the mobile device 12. The code is then transmitted to the mobile device 12. The proxy server 14 may be able to communicate with many mobile devices and applications servers simultaneously.

The scripting codes are then transmitted from the proxy server 14 to the mobile device 12. This transmission 30 may use a persistent communication connection between the proxy server and the mobile device and may comprise a series of linked display states 32 each of which is accompanied by metadata that includes storage instructions 34 and display instructions 36. A variety of different communication protocols may be used including TCP and UDP which may be transported over varied protocols and technologies including IP, GPRS, HSPA, Wi-Fi, Bluetooth etc. Transmissions may be initiated by either the client or the server so that the client may trigger a request for data or the server may push data to the client that it anticipate sit will need.

The storage instruction 34 may include a unique cache reference that defines where the associated state 32 is to be stored in cache 24. The proxy server 14 keeps a record of these cache references and so maintains knowledge of the contents of the cache 24.

Figure 2:
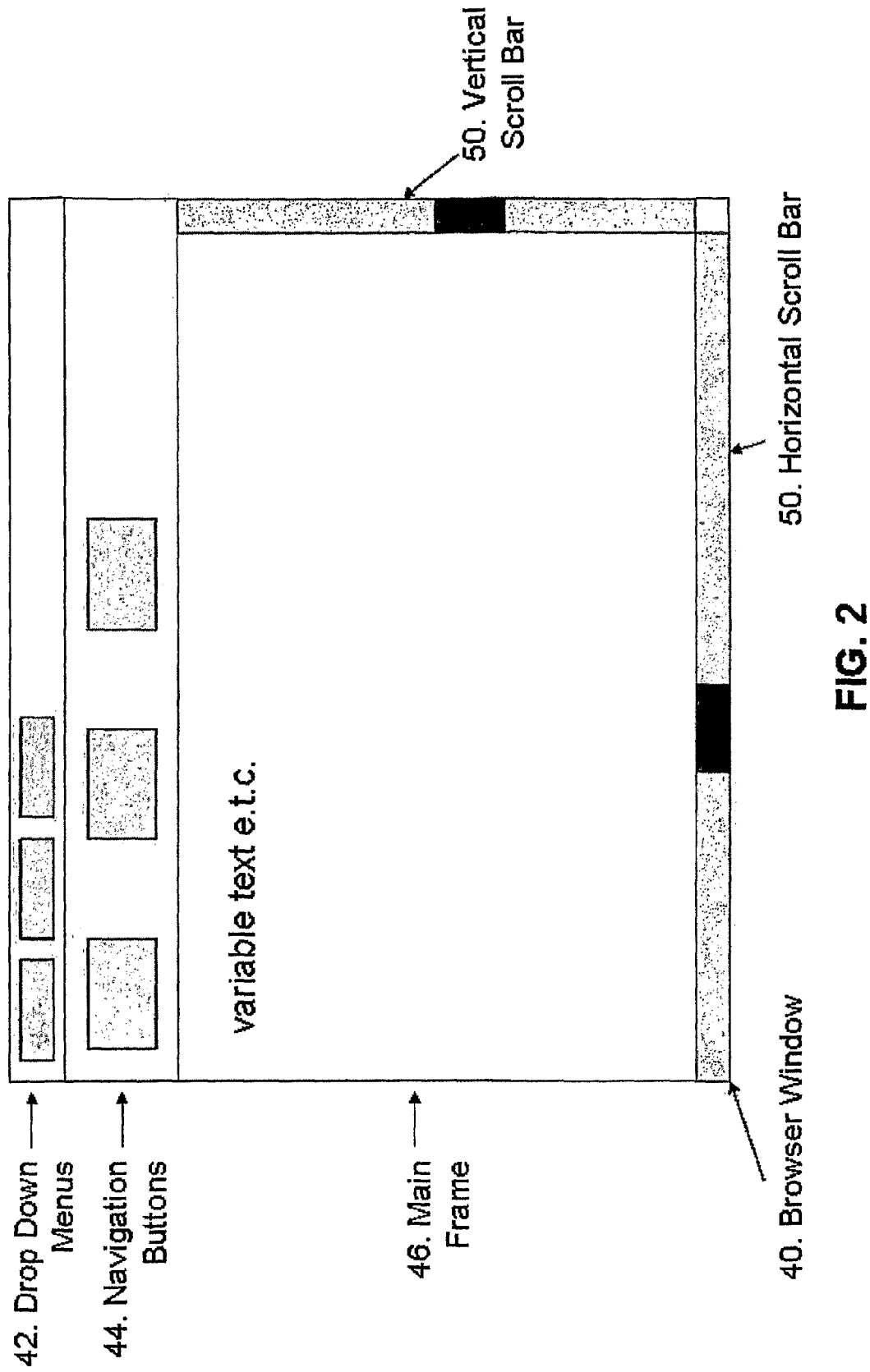
FIG. 2 is a schematic diagram of a browser application in accordance with exemplary embodiments disclosed herein.

The display instructions 36 include instructions to retrieve data from selected cache references and build a page for display on the mobile device. These instructions may cause a new display page to be built from scratch, but are more likely to update the currently displayed page with small changes. For instance, if the currently displayed page is a browser window (40), as shown in FIG. 2, the top bar (42) may comprise drop down menu items, the next bar (44) may comprise navigation buttons and the main frame (46) may have vertical (48) and horizontal (50) scroll bars and some text or images displayed in it. From one page to another the only part of the display that changes might be some of the text in frame (46).

Accordingly, the display instructions to cause such a new page to be displayed include directions to retrieve selected letters of a font stored in cache and to overwrite existing locations in the frame with those letters. As a result of reading the new text the user may make a further selection using keyboard (22) which might cause a further change in text. Alternatively the user entry might cause a more significant change to the display.

The system operates to reduce (or minimize) delays for the user between each display state, and it does this by loading pages and page elements into the cache (e.g., intermittently or continuously) when the communications channel is open between the mobile device and the proxy server. In particular new states might be uploaded while the user is reading the text displayed in the current page. The states that are uploaded will generally be those most likely to be selected for display next. For instance, if the user is reading a page in an application that is linked to five other states those five states might be uploaded.

The order in which they are uploaded might be determined by the historical frequency of their selection, or an algorithm operating at the proxy server (or mobile device) that takes account of the user's past behavior. Each of the five pages in the next generation may be linked to pages of another generation, and once the five pages are uploaded the next generation may be loaded.

In certain embodiments, it may not always be necessary to upload whole pages. The system may implement different strategies to upload complete or part pages depending on performance objectives being sought, the type of application and other factors. For example, the proxy may choose to pre-send the low bandwidth components of many pages while holding back the bandwidth intensive components such as images and/or video until the user actually navigates to the page. Thus, facts navigation may be achieved without high bandwidth. In other circumstances the proxy may choose to pre-load large, slow images it knows will be used (e.g. a logo image appearing on all pages) ahead of the text content of the many pages. These strategies may be defined in the system and/or determined from performance data that is gathered.

Where elements are held back the sending of the missing elements may be triggered by the proxy when it is notified that the client is navigating to that page and/or the client may explicitly request the proxy to send/resend the missing elements by requesting a specific resource reference.

The elements that are sent to the client may be retained in the working memory and in certain instances they may be volatile so they may only be available for the current session or until there is some form of reset (program closes, the device is reset etc). Alternatively the device may have persistent storage (flash memory, disk drive etc.) and the elements may be retained for a longer period. Elements will often be sent to the client in a compressed format and will need to be uncompressed before they can be used. Depending on the performance capabilities and/or storage capacity of the client device different strategies may be deployed for the retention/compression and/or storage of elements. For devices with slow processors uncompressing of elements may be minimized to the point that elements may be sent over the network uncompressed. For devices with fast processors but limited memory elements may be sent and/or stored in a compressed format. The client may have a default strategies for the retention and/or compression of elements but these may be altered through instruction sent by the proxy and/or determined by the client. The strategy may be manually configured based on device type, tuned automatically or combinations thereof based on performance data collected by the client and/or analyzed by the proxy.

For some devices and elements the same element may be stored in a number of places and/or states. For example, frequently used elements may be stored in long term memory in a compressed format, stored in working memory in compressed format a subset (for a number of recently used elements) stored in memory in uncompressed format and/or combinations thereof.

As elements are received by the client over the network the client typically determines where to place copies of the element and/or actions that should be taken. An element may need to be written into working storage, into long term storage or may be an element in the current displayed page so may trigger the update of the display.

Although, each page in this embodiment represents a single state, in exemplary embodiments, a plurality of pages may be used to represent states or a plurality of states can be defined based on a single page.

As the cache contents increase it becomes more likely that a particular user selection will be satisfied locally by the mobile device retrieving the page update or new page from cache, and not requiring transmission of the user selection to the proxy server, and the return of new pages from the proxy server. Of course, in exemplary embodiments, use of the "back" browsing function may always be satisfied from local cache.

In an exemplary operation, the client device navigates through a series of states. A state is defined in terms of a combination of other elements that can be transmitted independently to the client and that can be re-used in multiple states. In exemplary embodiment, a state consists of at least a page impression (the display on the screen associated sound etc) plus a set of keystroke mappings that tell the client how to move to another state when keys are pressed. A page impression may be defined in smaller areas of the screen called impressions. These impressions may abut each other or may overlay each other in layers. An impression may be defined in terms of other impressions, a combination of artifacts and changes to the impressions. The changes may be instructions to added, delete or replace artifacts. Artifacts are any images, graphic elements, sounds, video etc that are used to communicate to the user via the client. Artifacts may also be small pieces of code that may be executed on the client to render certain images or deliver certain effects.

When the proxy server is not uploading new generations of states it may upload artifacts and impressions as library data that contains state elements, such as new fonts, images or other material that is expected to be useful at some point in the future.

Using this functionality described herein, an exemplary system may be able to support a wide range of different applications such as, for example, email, searching, navigation; streaming information; viral marketing; interactive TV; chat and meeting applications; entertainment guides; and/or secure transactions, etc.

Figure 3:
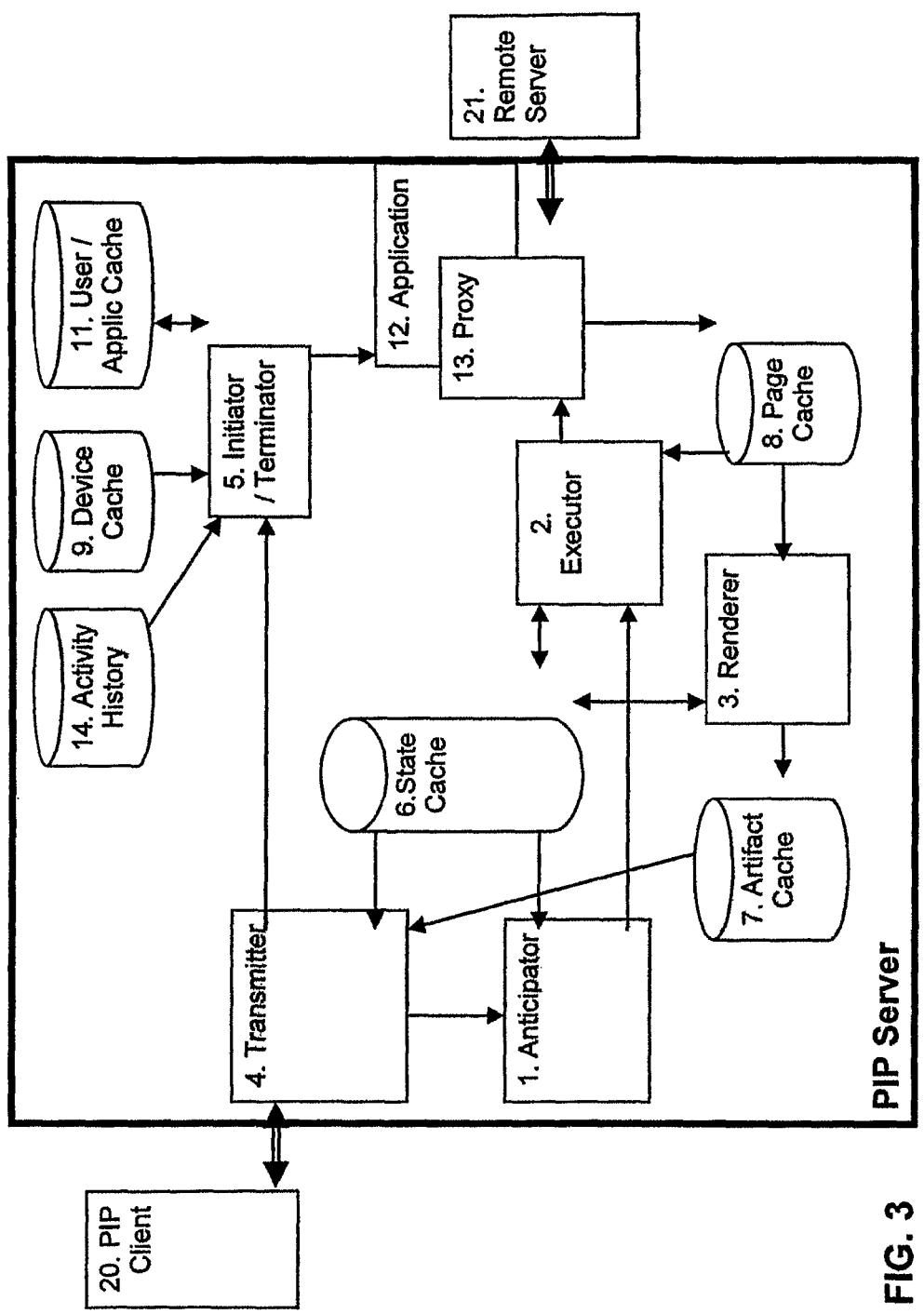
FIG. 3 is a schematic diagram of an exemplary server in accordance with exemplary embodiments disclosed herein.

FIG. 3 is a schematic diagram of an exemplary server in accordance with exemplary embodiments disclosed herein. As discussed above, the server can be implemented in hardware or software. Generally, the server comprises five general modules: an anticipator (1), an executor (2), a renderer (3), a transmitter (4), and an initiator/terminator (5).

The anticipator may be configured to respond to client state requests and anticipate future state requests. When the client device (i.e., the user device) first makes contact with the server and is validated by an authentication means, the anticipator causes to be generated and then commences transmission of a page instance—which, in exemplary embodiments, may comprise a page impression (which itself may comprise multiple layers) and a state transmission table. The anticipator then, according to internally defined rules and the current state, determines the order of transmission of data from the proxy server to the client. The current state is defined by the last requested state requested by the client. Using this as a guide, the anticipator determines which states (or page instances) ought to be sent to the client—starting with the current state and then any states that can, through the mechanism of the state transition table, be accessed from the current state. A typical algorithm for determining the transmission priority will be to transmit in order, those states that can be directly accessed from the current state, followed by each state that can be accessed from each of those states, followed in turn by further states that can be accessed. The anticipator may optionally apply additional rules to further rank states, (e.g., rules designed to predict the more likely user input or actions and rank those states higher for transmission). The anticipator may also only partially send a given state's page impression so that more partial impressions can be sent than could be sent if full impression are sent. The remainder of any impression might then be sent at a lower priority rank.

The executor is initiated by the anticipator and generates new states and state transition tables or keymap tables. The executor defines the set of page impressions that are the basis for transmitting the page to the client, taking as an input a specified page instance and the application page description. The executor generates as an output, a set of instructions that will result in an impression of a state being rendered on the client device. The source application page and a current state are generally provided as inputs to the executor. When requested to do so by the anticipator, the executor interprets an application source page to determine the possible alternative states that might arise from the current state as a result of user input or other stimuli. Taking as an example an application page that represents a large document through which the user can navigate both horizontally and vertically, and given as a starting point, the top left of that document, the executor may determine that the possible alternative states arising from the current state are two—one being the current state, but displaced downwards, and the other, the current state but displaced to the right. The amount of the displacement in each direction being determined by the application (the scrolling increment). As a result of the executor function, a state transition table may be generated as part of the current state, and the two new states may be written to the state map.

The executor requests the renderer to determines the layout of the page taking into account the properties of the client device such as the display area and image quality. The layout may be defined in the response from the application or server, for example in the form of a markup language. Alternatively the renderer may perform a mashup of data, markup, CSS and templates from a number of sources. For example, it may apply style sheets, execute code in the form of Java, Javascript or the like, or execute server side include code such as PHP.

The renderer determines whether any elements in the markup language or template are not supported by the system or client device and can omit any unsupported elements as it determines the layout.

The renderer places elements relative to each other on the page such that it logically or literally determines the effective X and Y offset and size of every element in the display.

In certain embodiments, the renderer can break down the page into a set of components that may can be recombined to render the page. Text may be rendered as normal Ascii or Unicode complete with font instruction but may also be expressed as a series of glyph images or by other acceptable means which can be combined on the client device to draw the text. This allows the transmission of text with sizing and/or presentation (such as character size, spacing etc) completely controlled by the proxy. It also allows the display of languages, characters and/or fonts that are not natively supported by the client.

In certain embodiments, using a series of glyphs to render text the client device may not need to be aware of rules for the presentation or layout of different languages as text layout and character rendering may determined on the proxy and/or sent as a series of glyphs. Whilst there is usually one glyph per character (e.g. Ascii or Unicode values), multiple characters may be implemented by a single glyph or individually characters may be implemented using multiple glyphs. The positioning of glyphs may be communicated in a variety of formats. Each glyph may be sent with specific screen coordinates or relative coordinates. Coordinates may be relative to the start of a segment and/or relative to other glyphs. The system for relative positioning may be communicated for a series of glyphs and/or different systems may be used for vertical and horizontal positioning. In certain schema Glyphs may be assumed to line up following each other with positive or negative offsets so their position is relative to the previous glyph. Under such a scheme some glyphs can be identified so that the next glyph ignore it's placement and is positioned relative to the preceding glyph.

In some languages and fonts the same character (Ascii or Unicode value) may be rendered as a different visual representation of the character (i.e. a different shape) depending on context, position in the word, etc. In Latin languages, a lowercase 'L' may be drawn narrower when it is part of a double L. In other languages the shape of the character can be very different, as different as 'a' versus 'e' in Latin. As the rules for determining which version should be used, text may be sent to the client based on a unique id for the character (eg. Unicode character) but also with sufficient details to determine which of the possible shapes should be used.

The executor uses this layout to determines how the page will be divided into states (page impressions) and determines which elements fall wholly within or partially overlap each page impression. An impression may define the complete output to a client screen or it may just define a segment of the screen. A page impression is associated with a specific state where a state includes details such as key maps. Section impressions describe only a subset of the client screen and are not directly related to states. Any impression can be built up from a number of other impressions so that a state impression can sit at the top of a hierarchy of impressions. Any impression may be part of the definition of any number of pages.

An impression can be defined in terms of other impressions, changes to those impressions, a set of artifacts, data and executable script. Impressions are transmitted to the client device from the server as a combination of these components. In an exemplary embodiment an impression may be defined as a simple string of artifacts with some control characters and special positioning instructions. In a very simple example, an impression may just display a name (e.g. PETER) followed by a space and a telephone number. This may start with the X,Y coordinates of where to place the first letter relative to the top right corner of the impression. This is followed by the unique identifier for an artifact for an image that displays the letter P. This is then followed by artifacts that contain images for the letters E,T,E,R. The space between the name and the phone number may be displayed with repeating empty images that would render just space followed by an artifact for the first digit of the phone number and then the remaining digits. In other scenarios the X,Y coordinate of the first digit may be sent. Impressions definitions may be more complex, they typically would span multiple lines and special linefeed and tabs instructions may be included.

In certain embodiments impressions can comprises a number of layers, and each layer is associated with a single set of data and an element of script. Impressions can also be individual layers used by other impressions.

Artifacts are elements that are used to generate output on the client device. If the output is by means of a graphical screen, the artifacts can be graphical images or video that can be rendered on that screen. If the output means include a speaker, the artifact cache can also store sound. Artifacts can be small code segments and some data that can be executed by the client. For example, a code artifact could contain instructions to the client on how to draw a specific share such as an oval together with the data describing the dimensions of the oval including line width, fill color etc.

As necessary, the renderer may cause artifacts to be written to the artifact cache, for transmission to the client. The renderer may describe the impression in terms of a set of data that will be acted upon by executable code segments (e.g., code segments executed on the client) and a set of artifacts that will also be rendered by the code segments on the client.

In certain embodiments, some pages (e.g. private emails) may be unique to each individual user and therefore to individual client devices and can be defined largely in terms of the artifacts that are already on that client and/or in terms of references that are specific to that client (e.g. unique IDs or memory references). Other pages (e.g. news articles) may identically when seen by many users. For performance and other reasons it may be desirable to determine the presentation and/or rendering of the page once but transmit it to each client in terms of the artifacts pre-loaded on the client, client specific memory references, etc. The page may be rendered and/or expressed once in terms of system generic artifacts and given a completely different reference. For example, an image may form part of a client specific page and is given a reference X when sent to the client. The identical image may appear on a shared page and when this is rendered for a different user, it is given a reference Y. When that shared page is subsequently sent to the first user the reference Y typically is mapped to the object know to the client as X or the artifact must be resent at item Y with duplication on the client and additional bandwidth usage.

Alternatively, in certain embodiments there may be a process to translating the system references to client specific references before transmission to the client. Another approach may involve sending a set translation rules or associations to the client so that it can convert the system references (Y) to the client specific reference into its artifact pool (X). To minimize the translation of references some artifacts that are might form part of the makeup of shared pages may be pre-allocated references and/or pre-loaded onto the client. For some artifact types references could be generated to be unique across the clients. However, for some artifacts this may generate some very long references which then need to be transmitted across the network.

Many impressions derived from totally different pages may actually be similar or have significant sections that are similar. In particular, when they are from the same site or application. For example, every page may have the same header and footer and any impressions that show the header or footer may be the same in which case the page impression of the new state can use the existing impression to define part of the new screen. Other impression may be similar, but not identical to an existing impression. In which case the most efficient way of transmitting a new impression may be to express that impression as the delta between itself and the existing impression, assuming that it has already been transmitted. Certain embodiments can optimize the breakup of a page impression into component impressions so as to increase the probability of generating duplicate impressions. Other embodiments can optimize the efficiency for identifying duplicate or similar impressions.

Figure 5:
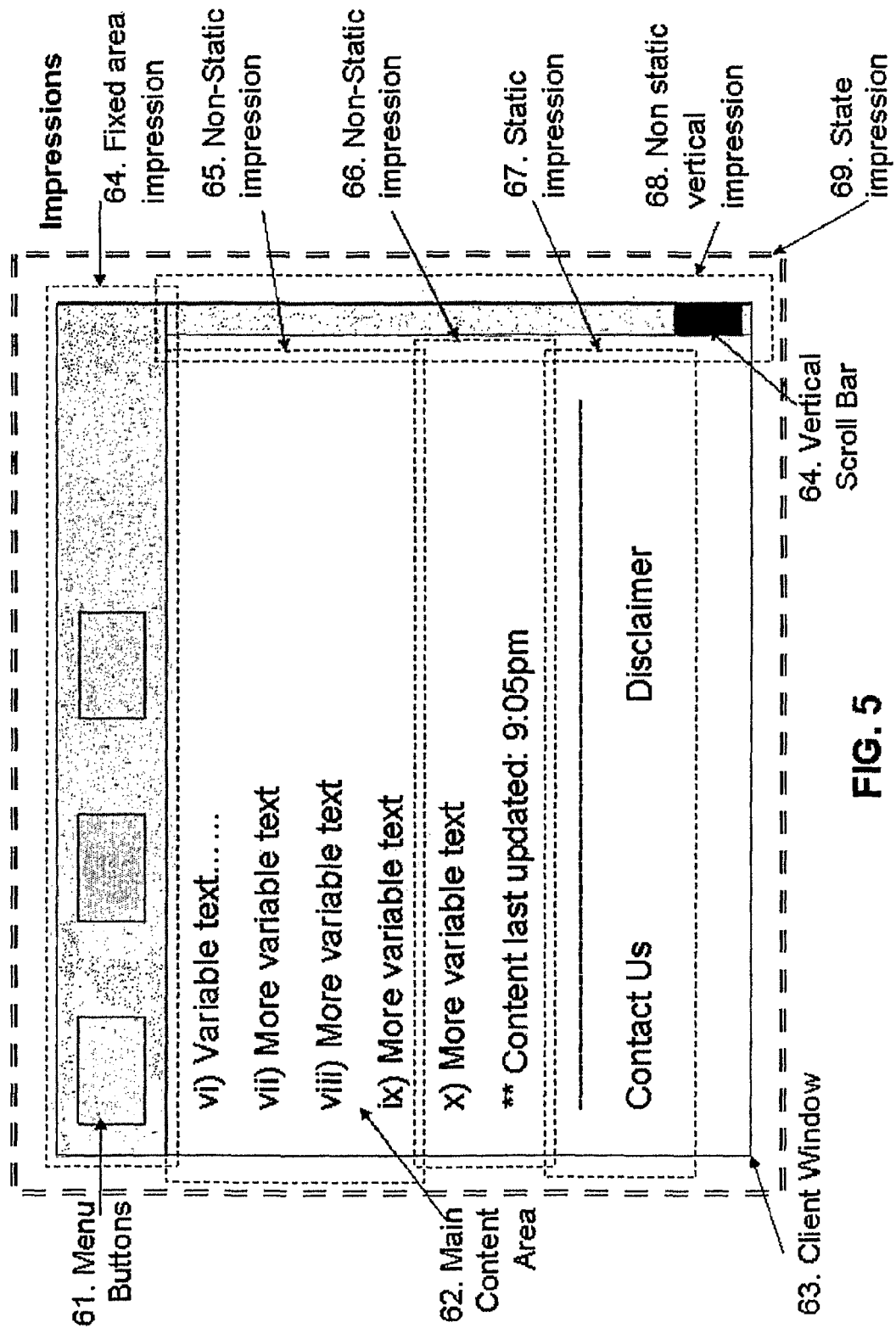
FIG. 5 is a schematic diagram of an exemplary definition of a state impression in terms of other impressions in accordance with exemplary embodiments disclosed herein.

For instance, if the client device is in a certain state and content is displayed in client window (63), as shown in FIG. 5, the top bar my be a fixed area with menu buttons (61) that do not scroll with the content and a main content area (62) which is showing an area of text through which the user may scroll (62). At the bottom of the scrollable text which is a static footer which is the same on a number of pages. On the right is a scroll bar showing the users progress through the scrollable text. The renderer may break this page into a number of impressions which in combination are used to express the state impression (69). The fixed impression (64) and the static impression (67) and the scroll bar impression (69) are likely to have been defined for other states and may not need to be resent to the client. Similarly the non-static impressions (65,66) may have been used to define the state when the user was scrolled higher in the document. The state impression (69) may be expressed in terms of the other impressions (64-68) and no new content is sent to the device.

If the page is an updated version of a page that has already been sent to the client then the renderer will first look at the impressions of the older version as a starting point to base the new definition.

Figure 6:
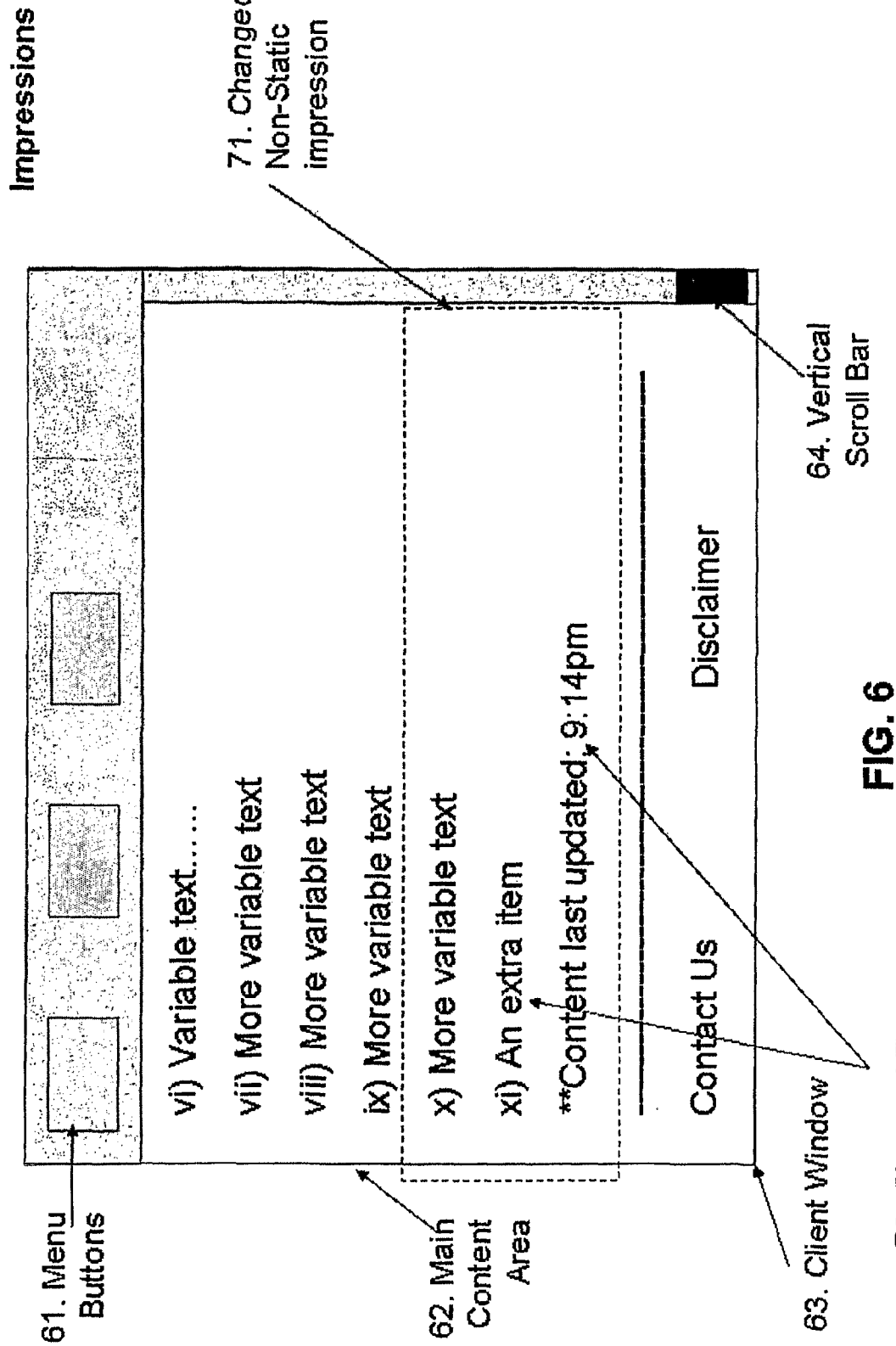
FIG. 6 is a schematic diagram of an exemplary definition of a changed page based on an older version of the page in accordance with exemplary embodiments disclosed herein.

If the screen content in FIG. 5 should change over time as shown in FIG. 6 this is a new state with a new page impression. The renderer can easily determine that only one of the impressions that composed the old page impression (69) has changed, in this example the changes (70) are the addition of an item to the list and an update of the displayed time. The renderer may define a new impression (71) in terms of all the artifacts that appear on the impression, or alternatively in terms of the previous impression (66) with the insertion of some extra text characters and the replacement of the old time with the new time. The new page impression may be defined in terms of impressions 64,65,67,68,71 or in terms of the old page impression (69) without impression 66 but the addition of impression 71.

In certain embodiments the page impression may be defined in terms of the old page impression (70) with the new impression (71) in a higher layer that sits on top of it.

Meta data, for example in the response from the server, within the markup language, or in a layout template can provide details about the variability of the content over time or between pages. Sections of the page that do not normally change over time can be marked as 'static'. Other areas are assumed to be dynamic and the information within them may change when the page updates. Areas such as the header and footer are typically static for example. The server can also include in its response instructions that the whole page may have changed and that static areas should be assumed to have changed.

In certain embodiments, when the server or application is merging a template with a data source (e.g., an XML feed) to generate pages the elements template defined in the template could be assumed by default to be static and the areas where variables are being substituted with data could default to non-static.

The meta data can also define fixed areas of a page. There are sections of the page that do not scroll as the user navigates down a page. These may be headers, footers etc. These areas will be the same for many states built on the same page that are used as the user scrolls down the page.

Figure 10:
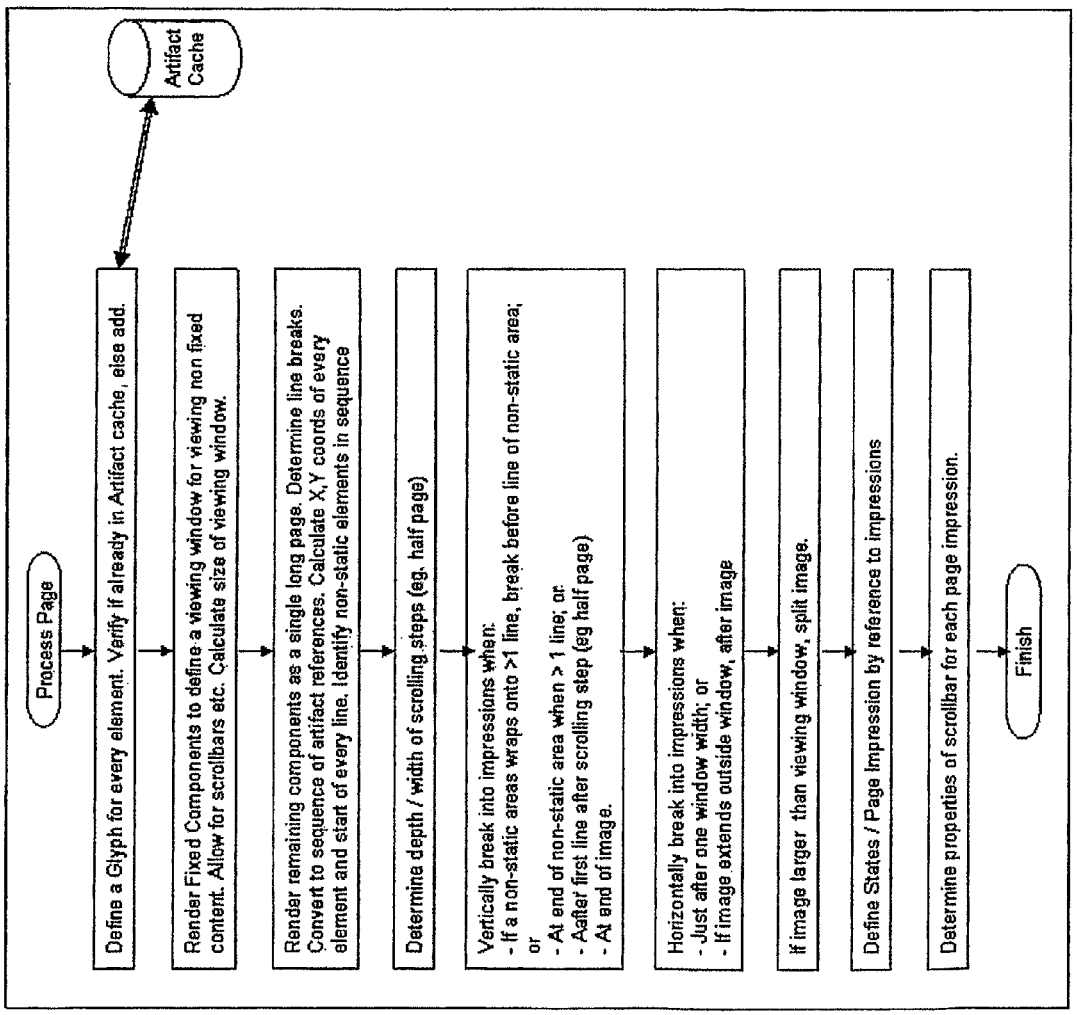
FIG. 10 is a schematic diagram of an exemplary process for the conversion from a page to impressions and the definition of states/page impressions in accordance with exemplary embodiments disclosed herein.

The executor may use information about fixed, static and non-static areas of the page when determining the impressions for the page. For example one set of impressions may define the fixed areas, another set describe the static areas and a third set describe the non-static areas. Non-static areas that scroll on to multiple lines may define breakpoints between impressions. FIG. 10 illustrates an exemplary process that could be applied in rendering a page and defining impressions.

The meta data describing the page can name sections of a page that are to be repeated across a number of pages without change. For example, the page footer can be named. Whilst the full definition of that section may be repeated in every response from the server or in every template, the renderer can use this information to quickly and confidently define areas that will be separate impressions and to re-use those impressions when defining the makeup of other page impressions.

Figure 9:
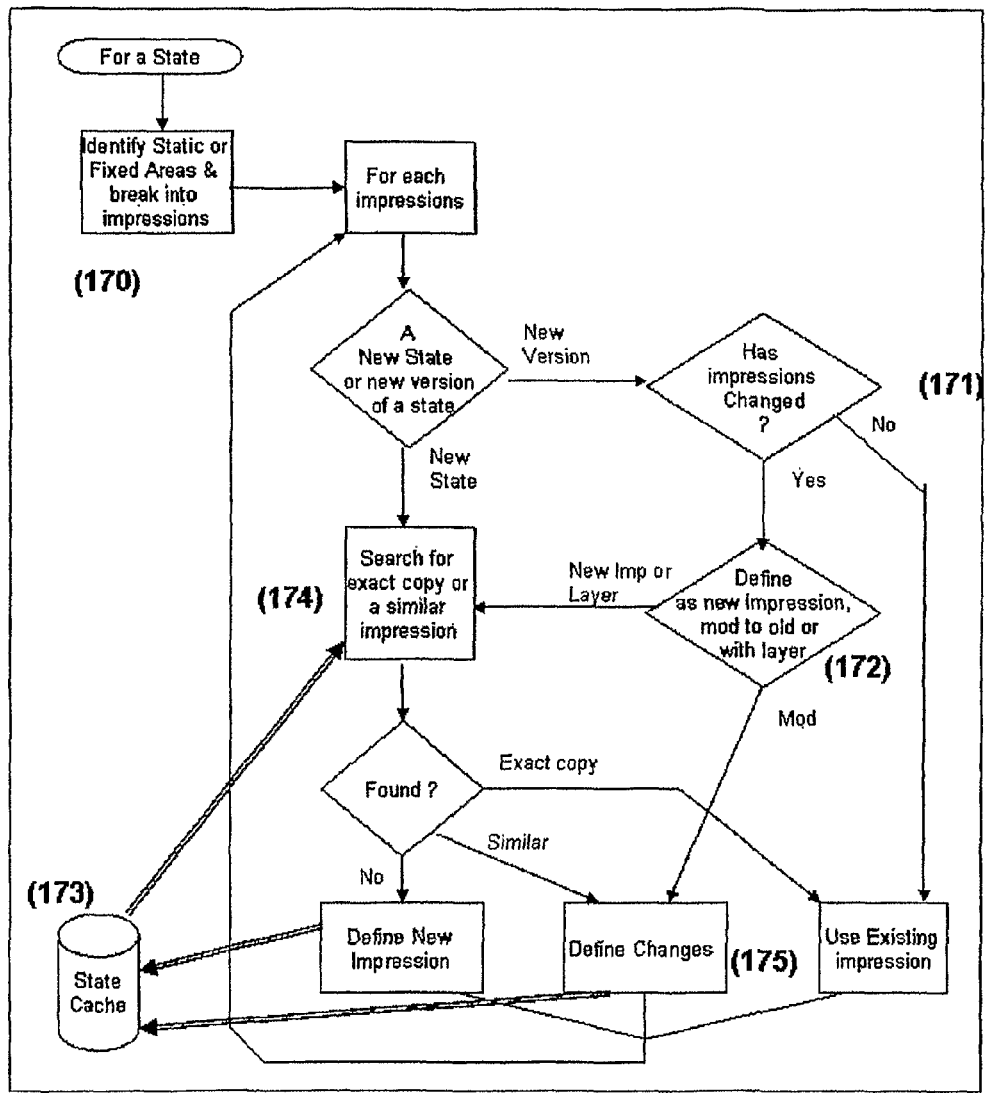
FIG. 9 is a representation of the renderer's method for managing changes to page impressions and impressions of changed pages in accordance with exemplary embodiments disclosed herein.

The method for management of the changing pages is indicated in FIGS. 9 and 10. The page must frequently re-request pages to obtain more up-to-date content. Frequently the page will have changed little but where changes have occurred the system can minimize the amount of information that needs to be resent to the client to communicate the changes. The pages may be assembled by the proxy server from a number of sources, the first task of the system is to build the page from the latest information (150) and this version of the page is written to the page cache (151).

The system checks in the cache to determine if this is a brand new page, if it is it proceeds to define new states from the page (158).

If this is a new version, in certain embodiments, the system compares the old version of the page with the new version of the page to determine whether anything has actually changed. If the markup of the page distinguishes between static, fixed and non-static areas the comparison may only compare non-static sections (155). If there are no special areas defined then the full definition of the page will be compared (154).

The comparison may be between the elements of a document object model or it may be a basic character by character comparison of the markup language (155). Where fixed or static areas are defined the comparison will look at the non-static areas. In other embodiments each page could be reduced to a signature value using an algorithm or check sum and may be used as one index into the page cache (151). The system may compare the recent versions of the page as received from the server to determine what has changed within that page and anticipate whether many of the impressions built upon the page can be used to define the new version of the page (154).

Where the page is larger than the screen size of the client device the system will determine the display units through which the page will be displayed on the device (158). Each unit of display is a page impression and will relate to one on many states.

Meta data about the page elements, the markup of static and fixed areas and other techniques can be used to determines the expected scope of any change on the page and the implication for its breakup into page impressions and states and the amount of change likely to each page impression (156). For example, a change to the style sheet, the background color or default font of the page will have a scope suggesting the whole page, and therefore every page impression will have changed, while a change to a small block of text may have a scope of the one page impressions on which it appears. Certain changes imply that all impression to the right and below of that element will have changed because the change will have altered the absolute positioning of all other elements. Other changes can be very localized and only change a very small area of the screen. As an example, a stock price may have changed by a small amount and only a few characters will have changed.

In certain embodiments the system may build a signature, checksum or similar that represents a page and compares the signature between two versions of a page to quickly determine if the page is little changed or significantly changed. The signature definition would focus on the layout of the page rather than the detailed content within the page in order to determine if items have moved. As an example, the signature may be based on the number of elements in the page and the X,Y offset of the elements.

In certain embodiments the page impression may be converted into impressions and the definition of the impressions compared to determine if they are the same or similar. A page impression may be represented by a number of impressions, some are changed others are unchanged. The system can send the new impressions for the page but simply reference the old impressions.

In certain embodiment the executor enables the definition of fixed or static sections of a page to be identified within the markup language or response from the server. Impressions that are based exclusively, or primarily upon these sections of a page are more likely to be duplicates of impressions already sent to the client.

In certain embodiments the insertion, removal or resizing of elements in a page may have displaced sections of a page so that they moved up or down the page but are otherwise unchanged. For example, the footer of a page may have moved up or down. In these cases, the new impression of a page can be determined to be an offset of one or more old impression of a page. The new page impression can be defined in terms of two old page impressions spliced together plus an offset where at which point the combined joined image is cropped.

With reference to the exemplary embodiment illustrated in FIG. 9, the executor may use the information about the changes to the page and areas of the page defined to be static to determine optimum breakpoints between impressions (170).

If the page being processed is a new version of an existing page the executor will first check whether the impressions for this version have changed since the earlier version (171). If they have not changed, the page impression will reference the old impression, if they have changed the executor will determine whether to define the new impression as it term of changes to the old impression, overlay it with a layer or define a new impression (172).

The executor searches the State cache (173) to identify candidate impressions that can be used as the starting point for expressing the new impression in terms of differences (174).

The executor first determines whether to expend effort searching for a duplicate or sufficiently similar impression to use. For example, it may not do so if the current impression definition is already very small and therefore is already easy to transmit or if very few impressions for the application have already yet been generated and transmitted to the client.

The executor only looks for similar impressions among those that have already been sent to the client because it does not control the order in which they are sent and the new impression may actually be sent first.

In certain embodiments the executor will implement an appropriate access method to quickly identify duplicate or similar impressions within the database of impressions. For example, the system can reduces each impression into a distinctive signature which can be indexed or hashed to aid searching and may be used as part of a quick evaluation when comparing impressions. The signature is designed to firstly identify any identical impressions or to identify the impressions with a highest commonality.

A simple checksum approach can be used to find identical impressions. Other methods can be used to identifying similar but non-identical impressions and the system may apply different strategies for different sites or applications. The strategies can use a combination of the URI (or sections thereof), the number of components, and various attributes of the components that appear in the impression including their X,Y coordinates, offset from the bottom of the page, the type, and/or size.

When comparing two impressions the executor determines whether it is more efficient to send a new impression rather than sending the differences between the two impressions. This evaluation will depend on the format, complexity and size of the instructions that would need to be sent to the client to express the differences. The algorithm used to find similar impressions and to compare them should reflect this. It is easier to define and send changes when all element are in the same location on the screen and remain the same size. The definition of one element can simply be replaced by a new definition and the rest of the impression definition is unchanged. Similarly, offsetting an impression to move all elements the same distance in the same direction may be simple to define. In contrast moving elements relative to each other around the screen may require a verbose definition and not deliver bandwidth saving.

In an exemplary embodiment of the search used, an algorithm can build an index of every element in the order of their X,Y offsets within the impression. The search algorithm could accesses the index to find the impressions with the most elements in the same position and use these as the first candidates for evaluation as a suitable starting point to define the new impression.

For each impression that is evaluated. The algorithm will compare the exact contents of the impression. The comparison may be linear from the start to the end, may run from the end to the start or may start by comparing a specific area, for example skipping over areas that are defined as static and focusing initially on comparing known dynamic areas.

At any point in the search the search may finish when an impression that is 'good enough' is found or when the system determines that it is unlikely to find an impression with sufficiently similarity such that the definition of the delta would represent a significant savings of bandwidth.

For the best scoring impression the system then determines the exact differences between the two impressions, and builds a definition of the impression complete with reference to the old impressions and instruction to the client on how to apply the differences (175). This new impression is added to the State Cache (173).

In an exemplary embodiment when an existing impression is selected as the basis for defining differences for a new impression it will be marked to ensure it is not removed from the client's cache before the new impression is transmitted. When the new impression is transmitted, a copy of the original impression may be taken on the client. The original impression may be marked that it can be deleted when no longer required. It is possible for the new impression to be deleted before it is sent, in which case the original impression is again released to be deleted.

The executor can maintain statistics by site, application etc on the frequency with which duplicate impressions are found between different pages or between different versions of the same page. The system may use these statistics to determine whether to search for duplicate impressions or just build a new impression immediately. The algorithm to determine this may take into account various factors, including for example the frequency with which duplicates are found, the system load at that point in time, the number of impressions already uploaded to the client, the number of elements on the impression, and/or the priority to conserve different resources such as bandwidth.

The impression may be stored in the page cache (173) on the server in two formats. One is the definition of the impression that is sent to the client as the required instruction to draw it. The second is a pure definition of the appearance of the impression if it were drawn from scratch and without reference to another impression. The latter may be used to compare two impressions by the executor to determine if they are the same or similar.

In certain embodiments the page may contain a marker which the client will replace with a common piece of data supported by the client and which is substituted when the page is displayed. Examples of such values are the date, time, user's name, and/or location. Impressions that would otherwise have been different would now be the same.

In certain embodiments an impression may be defined for an area that the user can zoom into or an area where output from another application running on the client may appears in the page.

Some client devices can resize their screen sizes. For example by changing the display from portrait to landscape. States are typically created against a specific screen size. If the screen is resized on the client then a series of new states are generated for the new screen size and each new state will have a new page impression defined. The system may define the new page impressions in terms of the existing impressions.

The transmitter may be a continuously operating process that causes data generated that has been requested by the anticipator, to be transmitted to the client. The transmitter regulates and initiates the operation of the anticipator, to generate data as required to send the client.

The server may, in exemplary embodiments, also contain six major caches and/or databases: the page instance or state cache (6), the artifact cache (7), the page cache (8), the device cache (9), user/application cache (11) and the Activity History cache (14).

The page instance or state map stores page state information and shares its indexing system with the client. The state cache has entries for every page instance or state that has been generated by the proxy server either as a result of a client request or as a result of the operation of the anticipator. The state map entries may comprise a URL (which refers to some application source page), some state information (which defines some state of that application page—for example the current scroll position), the state transition table which maps inputs (e.g., keystrokes, etc.) to other states and a progress value that records what portion of the page has been transmitted to the client device.

The artifact cache is a storage means that records and indexes each artifact necessary to render the page impression. The artifact cache is populated by the executor as it generates each page impression and is read by the anticipator as it prioritizes and mediates transmission of the data from the server to the client (e.g., the user device).

The page cache is a storage means that records the source application pages. The page cache may be read and interpreted by the executor to generate states and key maps (or state transition maps), and by the executor as page impressions and impressions are generated. The page cache may operate in a read through mode. For example, if a read is attempted for a particular page that is currently not in the cache, the page may be automatically read from the applications, cached and passed through to the requester.

This device database is a memory that stores metrics about client devices. These metrics determine such factors as the input and output capabilities of the device which in turn affect how the anticipator, renderer and executor perform their functions.

During operation, the client device may contact the server to initiate a session. An authentication means may exist to restrict and allow communication between the client and the proxy server. The server may identify the user using identification of the client, through a login process or other means.

Once the client is identified, metrics may be retrieved from the device database to determine the input and output capabilities of the device. Details obtained may include the display size and its properties, keyboard details, scroll wheel, cursor, speakers, Bluetooth, infrared etc.

In exemplary embodiments, the client initiates a request to the server (10) to execute an application or to open a web page. The request is received by the transmitter (4) and passed to the initiator/terminator (5). The initiator/terminator checks in a database (11) to determine if there is specific data for the user relating for the application. This may be cookie data, settings, the user's home page etc or data stored relating to an earlier session. This data may be included in the requests sent to a remote server, passed as parameters into the application or retained for later use within the application. For some applications the application may be re-opened in the state when the user last left it or using the web page last viewed.

The initiator/terminator may start an application (12) on the server which may be stored on the server or downloaded from another server. Alternatively it may instruct the proxy (13) to contact a remote server where the application is run or to a web server request web pages. All pages are written to the Page Cache (8).

Figure 4:
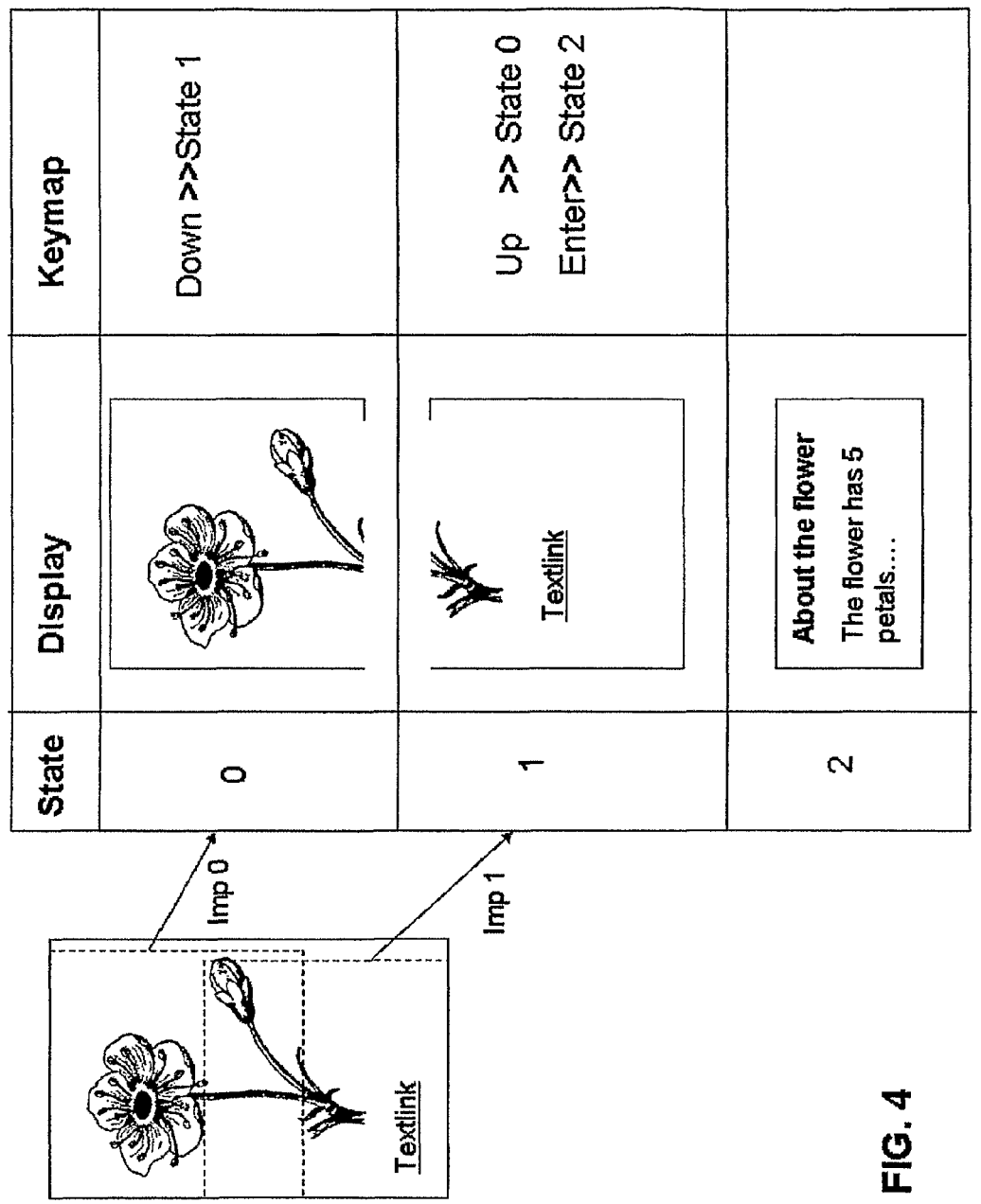
FIG. 4 is a schematic diagram of an exemplary conversion from a page to a state in accordance with exemplary embodiments disclosed herein.

With reference to FIG. 4 (which is a schematic diagram of an exemplary conversion from a page to a state in accordance with exemplary embodiments of the present disclosure), the Executor (2) takes the first page from the Page Cache (8) and graphically renders the page (e.g., the flower with associated text). It then determines the initial area of the first page impression (e.g., the top portion of the page) that can be displayed on the client device and this is established in the state cache (6) as state 0. The image of the flower in the artifact cache.

Content downloaded from the server by the proxy will have an effective lifetime before it expires and needs to be refreshed. States that were developed from the page may already be pre-loaded on the client so when the page expires the states associated with it also expire. The system manages the aging of the cached states.

The proxy reviews the age of pages that are already downloaded and identified pages that are considered out of date and that are candidates to be refreshed. It marks these pages as expired and sets a priority for refreshing the page based on rules in the system. The pages are not automatically downloaded as they may no longer be priority pages. The anticipator, while identifying pages that should be pre-cached in the client determines which expired pages need to be refreshed. If it determines the pages need refreshing the proxy to re-request the pages in the normal way that it requests new pages.

The anticipator applies rules to determine whether the impressions already loaded on the client can still be displayed or the client should wait until refreshed impressions have been sent. Rules may be specified for the site and include various factors including how out of date the page is.

If none of the states associated with a page have been transmitted to the client then the expired page is immediately discarded. A new version may be requested if required. If states associated with the page have been transmitted the system will decide whether to proceed with the current page or request a new page.

Normally the old version of the page and its associated states are discarded. New version will be displayed. However, if the user has started to view states based on the expired version of the page it may still be appropriate for them to continue to view that version. For example, if the user is navigating within a page or has navigated back to a page then the user would usually see the current version of the page.

When the user navigates to a new the system may verify that the cached version has not expired or whether it should be reloaded.

Figure 7:
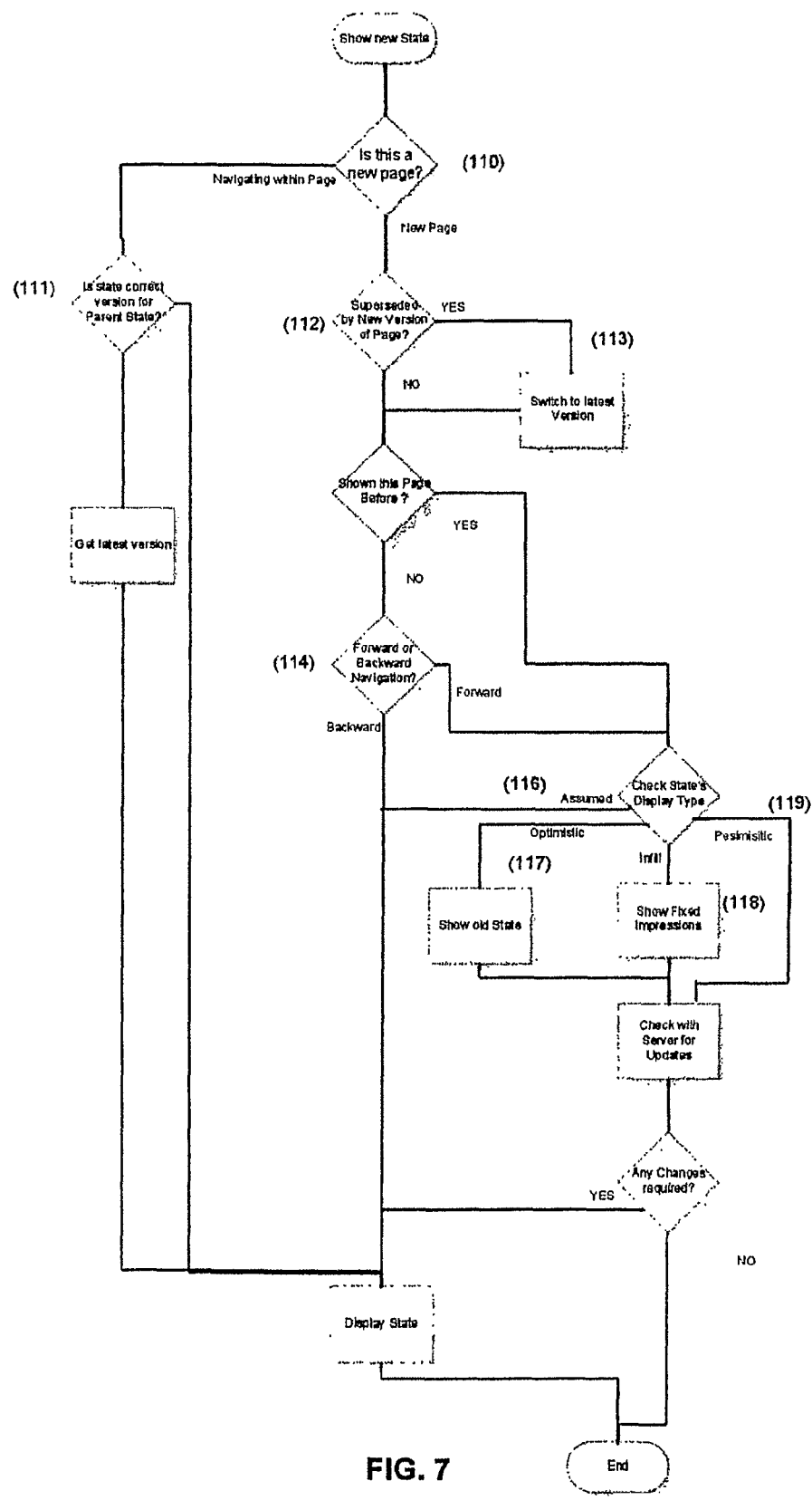
FIG. 7 is a schematic of the method in the client used to determine if the cached version of a state is still current and should be displayed in accordance with exemplary embodiments disclosed herein.
Figure 8:
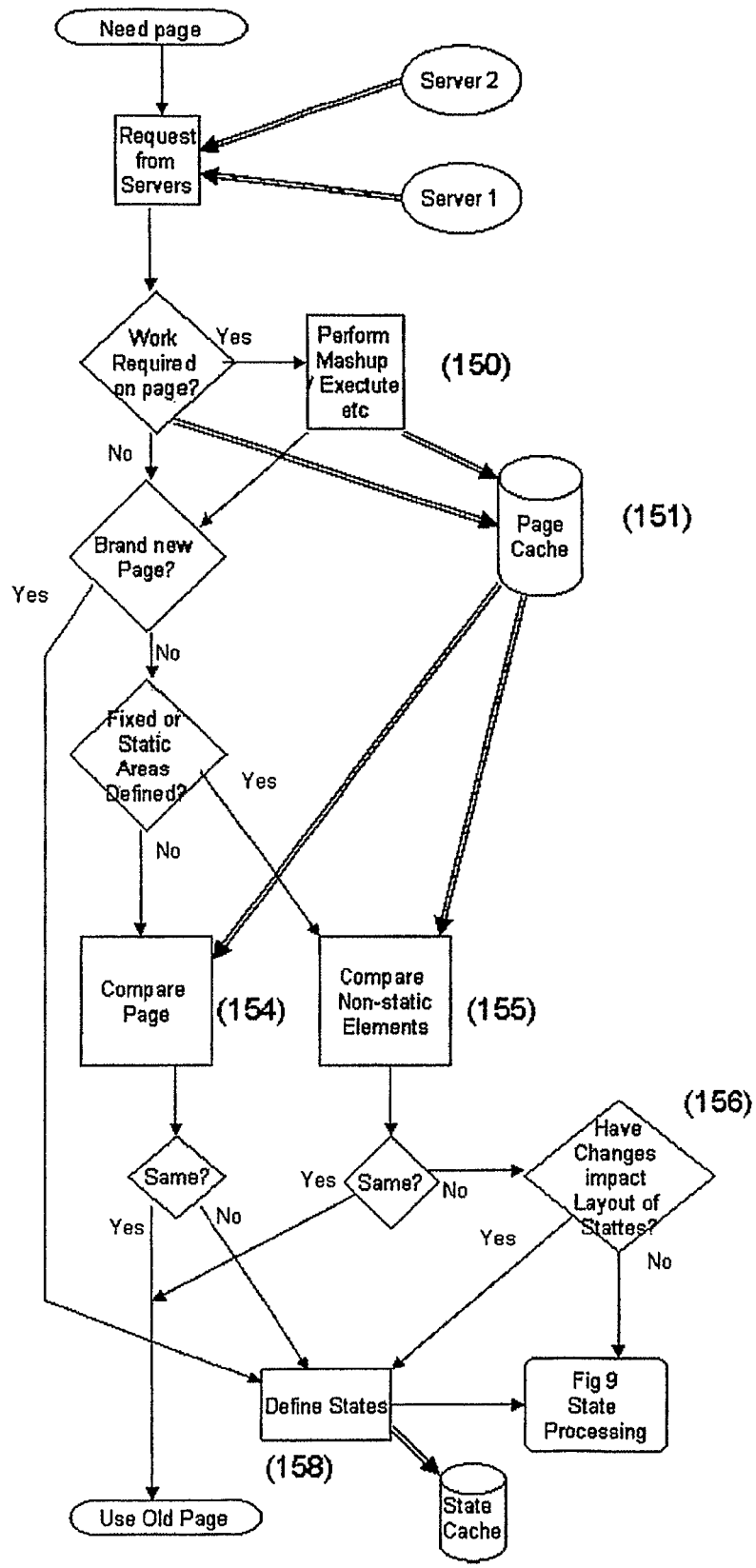
FIG. 8 is a schematic diagram of the Renderer's management of changing pages requested or built from the server or application in accordance with exemplary embodiments disclosed herein.

All pages in the system are given an expiry time based on configuration and rules in the proxy and any 'time to live' (TTL), 'last change time' etc. information supplied in the response from the server. States are then identified with a sensitive to aging. Whenever the proxy is notified that the client has navigated to a new state it checks rules for the aging of the state as indicated in FIG. 7. If the navigation between states represents the movement within a page (110) then the system does not need to check whether the page has been updated. The client will show all states based on a page using the same version of the page. If the user has explicitly requested a refresh of the page then it will be treated as a new page. If the navigation is between two states build on the same page then the system needs to check that the current version of the state is correct for the version of the page (111) being displayed. If it is not it will wait for the latest version from the server before it updates the display. This scenario should be infrequent because the viewing a state based on the new version of the page would be a trigger to the anticipator to generate and the transmitter to start uploading all the new versions of all states based on that version of the page. If the state does represent the start of a new page the client will first check whether this page has been superseded by a newer version of the page (112). When any page is updated the keymaps from other pages/states that navigate to the page are not always updated immediately. In case the navigation to the state has been via out-of-date key mappings from other pages, each version of the page can be marked as superseded at the point the new states are generated and uploaded.

In certain embodiments, when an application is executing certain actions taken may change the context for other impressions and make their content invalid. For example, an application may display the weather of different cities. If the user changes the current cities all impressions displaying the first city and now invalid. This may be handled by generating a set of new impressions and updating all keymaps to point to the new impressions. However, in some circumstances this may not be feasible or desirable. Instead pages may be linked to one or many contexts. If the context changes or becomes invalid then the pages may become invalid or expired. The client can be told that when a context becomes invalid then pages associated with it may be either fully refreshed from the server before being displayed and/or the cached version can be displayed but the client will typically notify the proxy and determine if a new version needs to be sent. The proxy can use the association between pages and context to determine when new versions of pre-loaded pages need to be sent. The association of pages to context can be defined within the markup language used to define pages or may be expressed as a rule to match against the URL of pages. Simple rules can be included to indicate when a certain context is invalid, for example when certain keymap options are selected and/or certain values are entered. Contexts may be interdependent and will often have a hierarchical structure. One context may be linked to another context such that if the latter context becomes invalid the first context is also made invalid.

The system checks whether the page has been shown before (113) and if it has, whether the user has navigated forward to the page (e.g. by selecting a link) or backwards to the page (e.g. by pressing the back key) (114). If the navigation was backwards, the old version will usually be displayed. The system may be configured that for some applications backward navigation is the same as forward navigation.

If the navigation is forward then the client evaluates the rules for verifying whether the underlying page has been updated (115). Each state may be configured to behave in at least one of 4 ways. As examples, 4 of the ways are: i) The page may be 'Assumed' to be up-to-date (116). The current state is assumed to be up-to-date with the page i.e. the page will not have changed since the state was generated. This is the default for most pages. The current state is displayed without checking with the server. ii) The page is 'Optimistically' assumed to not have change (117). The current state is displayed but the client checks with the server that the page is still current. If the current version is found to be out-of-date then the new version is uploaded. It may be immediately displayed or the user notified that a update is available. iii) The screen may be 'Infilled' with any sections of the screen that are not expected to have changed while the client checks with the server whether the page has changed and receives the updates. The sections that can be shown immediately are the fixed impressions and parts of the screen marked as static. iv) The client is 'Pessimistic' (119) and waits for an update from the server before it updates the display. It checks with the server whether the current version of the state is up-to-date and receives a new version if it has changed.

The system supports different versions of the same page as it changes over time. Depending on the rules defined for in the system, states on the new version of a page are considered to be different states to those created of the old version of the page. By default all forward navigation to the states will display the latest version which backward navigation will display the older version (i.e. the original state that was displayed). Once the new state based on the new version is displayed the old version will be disposed and all navigation (forward and back) will be to the latest version. Some keymaps in the browser may point to the old state of the page. A mapping is established that points all references to the old version of the state to the new version of the state. Typically it will be to an impression of the top left hand corner of the new version of the page, however, it some circumstances the state most closely mapping to the original segment of the page in the original state will be displayed.

Depending on the defined rules a full history of the versions of a page may be retained up to any number of versions. Then backward navigation will go to states of the original versions.

Once a user has started has viewed the first state of a page, all navigation between states that are based on the same page will always be between states based on the same version of the page.

For different servers or applications the proxy can be configured with rules on how it can use the pages or data returned. One rule may define whether the results returned can be shared with all users or are non-shared, i.e. private to the current user. A page may be 'global' where it can be shared by all users or 'user' scoped where the content is specific to individual users. The classification may be defined at site or application level or determined based on factors such as whether a user specific cookie was supplied in the request to the server.

The server or application, as part of its response can associate a page with one or more topics. At any point the server can communicate that the topic has changed and all pages associated with that topic have expired and should be re-fetched before they are displayed to the user. Actions defined within pages may also be associated with an action and when the user undertakes that action the proxy will recognize that the topic has expired. As an example, in an email application, a topic may be defined representing the inbox. When the server receives a new email it can notify the proxy that the inbox topic has expired. Any pages that show a part of the inbox will all then expire and the server will know to re-request pages. Another topic could represent the Outbox. When the user sends a new email the proxy can determine that Outbox topic has expired based on the action of send without notification from the server or application.

In certain embodiments all pages are by default associated with a master topic representing the application. At any point the application as a topic can be expired and all pages associated with the application will be flushed from all caches thus forcing a full reset for all users. This may be used, for example, when the application has an upgrade and normally static areas of a page are modified.

On traditional website there is one request to the server for each page on the website. Subsequent requests to the server retrieve components that appear on the page such as images. On a mobile phone the size of a web page is usually much smaller and so the content delivered in each page request is less and the server is hit with a lot more small requests. For servers delivering dynamic content there is usually a basic overhead in every request to set up the environment etc. Many small requests for dynamic content can result in disproportionate increase in the load on the server. When the application system is pre-caching pages there can be a surge of many small requests for linked pages that are being pre-loading. It would be more efficient if many pages could be delivered in a single request.

The request from the proxy to the server may request a package of pages in the response. The package could bundle a number of elements, for example it might include multiple pages as they would appear to a user. The package could contain the first page, followed by the set of pages that can be hypertext linked thereto. A package will typically contain related pages that are not dependant on significant data entry by the users, They would typically be the set of possible responses from a set of discrete options that are presented to the user. For example, all the pages that are hypertext linked from a base page.

The requested package can be returned in a number of responses. The first response may contain all the pages or it may contain just the first pages plus instructions on how to obtain the subsequent pages which the server may have generated but not transmitted.

The proxy receiving the package responses may break out the pages and process them separately. It may then determines whether, when and in what sequence to deliver each component of the package to the clients device as impressions, artifacts etc.

The proxy may instruct the server the appropriate size of the responses it should to build depending on the desired response time. The first packet may be smaller than subsequent packets if it is required immediately.

The proxy may adjust its pre-caching requirements for each server to help manage the load on the server.

The anticipator when identifying pages to pre-fetch can determine a priority for the request based on a number of factors including whether the user is waiting for the page, the probability the user will navigate to the page, the expected response time of the server and policies defined by the operators of the server (either pre-defined or actively specified in the response of the server).

The proxy may indicate to the server a priority with which to process the request. For example, the server may include in its response an indication of its state, such as whether it has the capacity to handle the pre-caching requests, or whether they should be throttled back.

Where the server delivers multiple pages to the proxy in one fetch, the executor can process the multiple pages together and identify common content that can be defined in impressions that can readily be reused in transmitting the content to the client.

The executor (2) determines how it can render the remainder of the first page on the client device as a series of impression. Typically the executor may break the page into a set of adjacent impressions that may, or may not overlap. Alternatively impressions may represent a zoom into the initial low resolution image. Each new impression identified is established in the state cache (6) as a new state.

The executor (2) determines what active elements are within each impression. These may be buttons, hypertext links, dropdown lists, enterable fields etc. For each active element the executor (2) determines how the user can navigate to them using the input capabilities of the device. There are a number of ways this can be implemented. Navigating down may jump a cursor from active element to active element. Alternatively the server can build a new state which the user can enter using a specific 'hot key'. In this new state which visually links each active element with a keypad number and duplicates this in the keypad to state mapping defining that state so that an element is selected or activated when the key is pressed. For example, an impression containing five hypertext links may be established as state 8. In this state the links cannot be selected. However, a hot key, say key 0, is setup to take the device to state 9. The definition of state 9 can draw a small menu over the impression of state 8 linking the 5 links (each given a number from 1 to 5). The definition of state 9 links the keys 1-5 to new states 10-14. Each of the states 10 to 14 may contain the content at the end of the corresponding hypertext links.

The executor (2) accepts elements within the markup languages that allow the page designer to control the mapping of active elements to specific keypad keys. For example, each hypertext link may be pre-assigned a number through the markup language and when that key on the keypad is pressed the hypertext link may be followed. As the page is originally rendered the appropriate numbers can be built into the display.

The executor (2) may determine how the screen may look when any action is taken by the user. For example, if a user action would open a dropdown list, the server might extract the list of allowed options and determine how to render the list (which is established as a new state).

The executor (2) may then attempt to build the state transition table which encapsulates the navigation and logic of the application. In particular, the executor (2) may determine how each input on the client device (e.g., each keypad button) will move the device to one of the new states. For example, whether moving down with a scroll wheel will move a cursor to a new active element on the initial impression or to page down to the impression immediately below. Each such association is recorded as a mapping of an input or keystroke to a new state in the state transition table.

The executor (2) may also determine which states the user can navigate to directly from the impression, typically these are the impressions immediately to the right and below the impression but may be in any direction. They may also be states associated with selecting an active element such as a hypertext link. The server builds the state transition mapping for the state associating different keystrokes or navigation action with other states. The mapping may support various inputs including, for example, scroll wheel movement, tapping on an areas of screen or a voice command. Not every key must be mapped. Not mapping a key effectively turns it off while in that state.

The server can establish new states to effect behavior on the server. For example, pressing the 2 key may simply make the character 'a' appear in an input field on the display while reassigning it so a second push will make a 'b' appear. This will affect a form of text input.

The server may recognize special extensions to markup languages that allows the page designer to mark active elements that should not be followed or activated by the server until explicitly selected by the user. Some active elements within the page may never be followed by the server. Extensions to the markup language can tell the server to ignore the normal display option that a normal browser displays and to present an alternative dialogue. For example, where there is a field for the user to type into, an alternative dialogue could implement an 'auto reduction' from a discreet list of options that the server can obtain from another source.

In exemplary embodiments, the renderer (3) may take states from the state cache (6) and break the image or impression into a set of small images or elements which it stores in the artifact cache (7). It may determine which images or elements are already stored in the artifact database and re-use them whenever possible.

Additionally, for each state, the server may determine the difference between the new state and a proceeding state. The renderer (3) may redefine the image or impression in terms of a previous state plus the overlaying of components in the artifact cache. If a page is very different from all other states it may be established as a base line state.

As discussed above, the server contains an 'anticipator' (1) which uses a prediction algorithm to determine the next impression or state that should processed by the executor (2), renderer (3) or transmitter (4). It will typically prioritize the states that the user is most likely navigate to from the current state on the client device.

The anticipator may constantly adjust priorities based on various factors including: the current state on the device, recent navigation, estimated time required to process a state, and latency experience to send the data stream to the client device. As the user moves from one state to another the anticipator may review the states that it has placed in the state cache and re-prioritize the order in which they should be processed or sent to the client device. The anticipator may be self throttling so as to stay a number of states ahead of the current state down any navigation path.

In exemplary embodiments, the transmitter (4) may control the delivery of the data stream to the client (20). The transmitter works through the state cache following the transmission priority that is set by the anticipator (1). The transmitter ensures that all the artifacts associated with a state have been sent or are sent to the client device. The transmitter may combine many states and artifacts into one packet to maximize transmission efficiency.

The executor may build a profile of the user's behavior over time in the Activity History cache (14), the data includes details about time of day and the user's location when they perform certain actions. The system may periodically analyze the activity history cache and apply algorithms to identify significant preferences and behavioral differences. The predictions may depend on any combination of the time, the user's location, the current bandwidth capability, recent activity by the user. In an exemplary embodiment the system may break the day into a number of time periods, for example hourly periods and it may define a number of geographic areas where the user is seen more than 10% of the time within a 1 km radius. The system will then determine the most common applications or options within the application that the user most frequently uses. For example, they may regularly use a weather application in the period 8 am-9 am in a suburban application which we might assume is their home. They may use a calendar and a mail application most frequently through the day at a different location which may be their office.

The anticipator may use this information to determine the order in which applications or content should be sent to the client. Thus the anticipator will give different priority to different content depending on whether the user is at home, at the office, walking down the street.

For each user the activity cache will hold data about the user's use of an application or site. Statistics may include the number of navigation links followed, the depth (in terms of pages or states) into the site the user penetrates, whether they scroll to the end of long articles, the speed with which they navigate through the site (keystroke speed), the proportion of pre-cached data that expired before it was used and any screens where they had to wait for content that was not pre-cached. This data can be used by the anticipators and transmitter to set priorities and optimize the pre-caching.

The renderer may also change menus and options, pre-select default values for options and generally tailor the user experience based on the behavior profile built up in the Activity History cache (14).

The transmitter may user data in the Activity History cache (14) to decide what it should drop from the client cache to free space.

The client (i.e., the user device) may, in exemplary embodiments, be a software program used to deliver application-like functionality to a wireless mobile device. The application functionality can be a fully functioning interactive application (e.g., a pocket calculator or a more complex example being an email client), or just a navigable document, such as a web page.

The client has access to a memory (e.g., a cache) which may be non-volatile i.e., data is not lost from the cache between running instances of the client. The client can write to and read from the memory. The memory may be divided into the sections of an artifact cache, a state cache and a code cache. Each cache may be structured and index by means (e.g., an index number) that can be used to lookup any element in the cache when required.

The client has access to an input means (e.g., a keypad or touch screen on a mobile phone) and output means (e.g., the screen of a mobile phone and a communication channel such as a GPRS channel or similar data channel available on the mobile phone).

For each state stored in the state cache (including state zero), there may exist either one or a multiple set of data elements (e.g., layers). Each layer may comprise a set of data, one element of which is an index into the code cache, another element of which is a state transition table and a final element may be operation data for a code interpreter.

The state transition table may comprise an indexed table where the index is the set of possible inputs (e.g., key presses on a keyboard) or device generated events (e.g., timer expiration events) and the data elements of which are indexes into a state store.

The code cache can store a multitude of indexed code segments that can be executed by a code interpreter. The code interpreter can execute a code segment on demand and can be supplied with operational data (as stored in a layer) and provide an output means which will be written to as the code is executed. The code interpreter also has access to the input means that it can read.

The artifact cache can store data elements that represent outputs that can be rendered on the output means.

The client functions by establishing a wireless data connection to a server upon initialization. Data received from the data connection is interpreted as data that should be stored in any of the three caches or as instructions to remove or modify data from any of the three caches. Simultaneously, from the non-volatile memory store, the client attempts to fetch data relating to the initial state, which is referred to as state zero.

If the cache for state zero is not empty, the client will then fetch the data for the first layer in the state. Using the reference stored in the first layer data, the client fetches the code segment identified and loads the code segment into the code interpreter. The client also fetches the operational data from that layer and provides that data to the code interpreter.

The code interpreter then runs the loaded code that then operates on the loaded data, which may typically result in the code interpreter sending to the output means, instructions and artifacts that are then rendered on the output means.

The code interpreter may continue to run indefinitely until self terminated (i.e. by the code itself executing a terminate instruction) or until a new state is fetched from the state cache. The process may be repeated for each layer in the currently fetched state.

Simultaneously, the client may await inputs from the input means. When an input is received, the client fetches the state transition table for the current state and attempts to look up the state as referenced by the received input. If the lookup is successful—i.e. a state transition table exists and it contains an entry for the received input, the client may then examine if an entry exists in the state cache for the referenced state. If such an entry exists, the client may terminate all executing code segments, and fetch the new state from the cache and repeat the above process.

If the cache does not contain such an entry, the existing code segments may continue to run until an entry for the referenced state is received on the open data channel. In the interim, further input from the input means may result in further output to the output means as controlled by the code interpreter and the received input.

For each attempt to fetch a new state (as referenced by a state transition table), the client sends a transmission on the open data channel, indicating which state is being fetched. This state information is subsequently received by the proxy and is interpreted by the anticipator function of the proxy.

Operation may continue in the above fashion indefinitely or until an instruction is received from the proxy to terminate the session. At that time, the open data channel may be closed and the client operation suspended until either an internally generated event occurs (e.g., a timer expiry), or a connection request is initiated by the proxy, or a user input is received. When any of those occur, the data channel may be opened and the operation resumed from the current state (or an initial state). During the suspended state, the content of the non-volatile memory may be retained along with the currently fetched state.

A page impression may be defined in terms of a number of impressions where some impressions are on different layers and may therefore overlay the each other.

Layers are rendered in sequential order such that the effect of each layer is visually superimposed upon previously rendered layers. Note that it is not necessary to literally render each layer in this way, as various programming techniques that are obvious to those skilled in the art can be used to optimize the rendering process to achieve the same net effect.

One type of artifact that can be used to create impressions are script elements. These are stored in the artifact cache, along with the data and other graphical elements and may be referenced to a different layer to the impression's layer.

The scripting engine built into the client executes the script associated with each layer and uses as data input the data elements associated with the layer (transmitted from the server and stored in the cache), and the current state of the client device including (but not limited to) the time of day, the status of various inputs, switches, light sensors, accelerometers and the keyboard input queue. Thus the appearance of any given state or impression may vary from moment-to-moment depending on the input queue.

As an example of the above, consider an input text line as might appear on a chat program or as part of a search screen for a search engine. In this example, the user will rapidly type a series of keystrokes into the client device with the expectation that those keystrokes will be read back to the user as a line of input text. Using the concepts described in the points above, the visual feedback will be generated by loading a new page impression for each keystroke. However, since two successive page impressions will vary by only a slight amount (the addition of a single extra display letter) for each keystroke, the page impressions can be more efficiently transmitted if the script associated with say, the top layer of the impression is able to read and process the keystroke queue. According to this idea, each item in the keystroke queue would be processed by the script if the subsequent page impressions (as would be selected by the keystroke) are not yet available in the device cache. The script would be arranged to display the graphic for each letter in the text area so as to appear as if the text were being entered into a text buffer. This provides a more perfect interaction with the user.

As an extension to the above idea, consider a text input box where the input mechanism is a numeric keypad which is used for predictive text alpha-numeric input. According to this idea, the number keys (1 . . . 9) translate into words by matching the letters assigned to each of the numbers (2=a, b or c, 3=d, e, f etc) against a 'dictionary' of allowed words. As the user types successive number keys, the overall application must translate these keystrokes into the corresponding letters but where there is no obvious one-to-one correspondence between the key pressed and the letter displayed. Typically this problem is solved by storing a large dictionary of possible words against which a lookup function is performed in real time.

According to the certain embodiments of the present disclosure, a page impression comprises of at least one layer and at least one script element which is responsive to the keyboard input queue. The data for the impression layer consists of a set of data, where each datum is a value from 1 through n, where n is the ordinal number of the last possible character mapped to a possible numeric key. For example, if the letter '2' is pressed, a value of 1, 2 or 3 is stored corresponding to the letters a, b or c. The data for the layer specifies for each possible state of the key input queue, which of the possible letters ought be displayed. Note that is possible (indeed probable) that subsequent entered keystrokes will affect the choice of letter for preceding ones. Assuming that only the keys 2 through 9 are used to map each of the possible keys, (8 possible keys) and that each key can take one of 4 values (4 being the maximum number of letters assigned to any one key), then every possible combination of these 8 keys for up to 4 successive keystrokes, using 2 binary bits to represent each possible key, requires only 1024 bytes (8192 bits).

As each key is pressed and reported to the proxy server, a new set of 1024 less 128 bytes (896 bytes) is transmitted to the device, representing the 4 next possible keystrokes branching out from the pressed key. In this manner, the client device achieves a degree of short term autonomy to account for network latency, while remaining instantly responsive to the user input.

According to another aspect of the certain embodiments, the same script will display dummy character place holders in place of actual letters in the event that the number of keys pressed exceed the 4 character buffer (or some other value) which is represented by the available data.

Note that the data stored for each layer is also effectively stored in the device cache. Accordingly, for each new state, any previous data set representing, for example, 4 successive key strokes, with similar pre-cursor keys, is available for re-used by the client application. Therefore, in a very short time, a very complete dictionary of all possible key strokes (and therefore all possible words) is accumulated in the device cache such that further (or subsequent) text input requires very little data to be transferred from the server to the client device.

In certain embodiments the server may use the approach outlined to supply to the client a special module that contains a complete, programmed keymap or segment of code for entering any text in the specific language of the user and specific to the keyboard and input characteristics of the client device. The module assumes that the entry of a character is repetitive and circular. When a character is entered the glyph associated with the character is appended to the current line of characters and the client returns to an input state awaiting the next character to be entered. The client may process a series of characters without communicating with the server. The client software has no in-built ability for text entry and has no understanding of characters or languages but when the client device reaches a state where free format text is entered the module is uploaded and the client assumes the ability to receive text entry in that language. For most languages the standard A-Z, 1-9 characters will be the same. However, the device can be easily extended to support special characters associated with different languages, punctuation etc.

Certain applications may develop special modules to provide specific support for unusual characters used within that application, for example the entry of mathematical symbols.

In certain embodiments the client may invoke the native tools or capabilities of the mobile device to enable the entry of text. The entered text will not be seen as keystrokes by the client but will be returned to the application as a block of text. In certain embodiments the block of text is sent to the server which interprets the characters and generates a new state with the entered text on the screen. In certain applications on some client devices in may be possible to paste a bock of text into an input field. The text will be sent to the server and it will be processed in the same way as text entered using the device's native text entry capability.

The keymap or segment of text may be defined to support a specific language on the specific device.

It should be noted that aspects of the present disclosure are entirely general purpose in nature and can apply to any key to character mappings, not just the letter to number mapping as described in the example. Note also that the mechanism is entirely independent (as far as the client device is concerned) of the language or even writing system employed.

Although the inventions have been described with reference to particular examples it should be appreciated that it may be performed in many different ways. For instance, the inventions can be used for applications where large documents are required to be uploaded to the mobile device such as a map based location application where a map that extends over many pages must be uploaded. In this case the first page may contain the area the user wishes to see first, or it may be a large scale map. After the first pages is sent then the surrounding pages, or pages that cover the same terrain in greater detail, may be sent as the next generation of states and displayed as subsequent pages on the user device.

The exemplary approaches described may be carried out using any suitable combinations of software, firmware and hardware and are not limited to any particular combinations of such. Computer program instructions for implementing the exemplary approaches described herein may be embodied on a tangible computer-readable medium, such as a magnetic disk or other magnetic memory, an optical disk (e.g., DVD) or other optical memory, RAM, ROM, or any other suitable memory such as Flash memory, memory cards, etc.

In certain embodiments, a method of providing applications style functionality to a user of a mobile radio terminal is disclosed, comprising the steps of: receiving a data stream transmission having a plurality of states, wherein each state is associated with output instructions and storage instructions, and wherein the plurality of states is configured such that moving through the states creates the appearance of executing an application on the mobile radio terminal; decoding the data stream transmission and caching each of the plurality of states with the associated output instructions according to the associated storage instructions; rendering a first state; responsive to an event on the mobile radio terminal, moving from the first state to a second state by applying the output instructions associated with the second state; and communicating a change of state to a server. In certain aspects, each of the plurality of states is an HTML web page, and wherein the plurality of states are linked via hypertext link. In certain aspects, at least one of the plurality of states is a small section of an original screen page and at least one of the plurality of states is an adjacent area of the original screen page. In certain aspects, the mobile radio terminal is a cellular telephone. In certain aspects, the mobile radio terminal is a personal digital assistant. In certain aspects, the server is a proxy server. In certain aspects, the data stream transmission comprises user datagram protocol packets over an IP connection. In certain aspects, the data stream transmission comprises transfer control protocol packets over an IP connection.

In certain embodiments, a method of transmitting data to a mobile radio terminal is disclosed comprising the steps of: interpreting the execution of an application such that the application can be expressed as a plurality of linked states through which a mobile radio terminal can navigate to create the appearance of executing the application; encoding a first data stream having ones of the plurality of linked states, wherein each state is associated with output instructions and storage instructions; transmitting the first data stream to at least one mobile radio terminal; and maintaining a record of the ones of the plurality of linked states that were transmitted to the at least one mobile radio terminal in the first data stream. In certain aspects, the method may further comprise the steps of: receiving changes in state of the at least one mobile radio terminal; and anticipating future state changes of the at least one mobile radio terminal to encode additional ones of the plurality of linked states into a second data stream. In certain aspects, each of the plurality of states is an HTML web page, and wherein the plurality of states are linked via hypertext links. In certain aspects, at least one of the plurality of states is a section of an original screen page and at least one of the plurality of states is an adjacent area of the original screen page.

In certain embodiments, a method of transmitting data to a mobile radio terminal is disclosed comprising the steps of: providing a current impression having a first set of screen elements; building an index of a plurality of impressions, wherein each of the plurality of impressions includes a set of screen elements; selecting ones of the plurality of impressions that have a set of screen elements that are the most similar to the first set of screen elements of the current impression; comparing each set of screen elements of the selected impressions with the first set of screen elements to determine a best fit impression; generating a data transmission that comprises a set of differences between the best fit impression and the current impression; and transmitting the data transmission to a mobile radio terminal.

In certain embodiments, a method of transmitting data to a mobile radio terminal is disclosed comprising the steps of: storing a set of character images; providing the set of character images to a mobile radio terminal; generating a data transmission from a web page according to the set of character images such that the web page can be reconstructed from references to the set of character images; transmitting the data transmission to the mobile radio terminal.

In certain embodiments, a method of transmitting data to a mobile radio terminal is disclosed comprising the steps of: transmitting a first state to the mobile radio terminal, wherein the first state includes a state transition table; determining an order of transmission of a plurality of states based on the state transition table of the first state; transmitting a second state to the mobile radio terminal according to the order of transmission without receiving a request from the mobile radio terminal.

In certain embodiments, a method of transmitting data to a mobile radio terminal is disclosed comprising the steps of: determining a variability of each of a plurality of elements of a first screen in an application; identifying a first set of areas of the first screen that can be repeated across a plurality of other screens based on the variability of the plurality of elements of the first screen; transmitting data representing the first screen to at least one mobile radio terminal; and transmitting data representing the first set of areas of the first screen to at least one mobile radio terminal such that the at least one mobile radio terminal can reuse the first set of areas for other screens.

In certain embodiments, a method for managing changes to a screen over time so that transmitting of changes to a mobile radio terminal is minimized, the method comprising the steps of: comparing a plurality of versions of a page to determine whether portions of the page have changed; comparing a plurality of defined non-static sections of the page to determine if at least one of the non-static sections of the page has changed; selecting ones of the plurality of defined non-static portions of the page that have changed; and transmitting the selected ones of the plurality of defined non-static portions of the page to at least one mobile radio terminal.

In certain embodiments, a method for managing content in a cache for transmission to a mobile radio terminal is disclosed comprising the steps of defining related content in a cache, wherein the related content is expected to expire at the same time; defining expiry times of the related content in the cache; verifying a validity of the related content; removing the related content from the cache upon occurrence of the expiry time of the related content; and requesting updated content to replace the removed related content.

In certain embodiments, a method for creating a personalized experience for a client application based on a time and/or location of a user is disclosed comprising the steps of: determining a plurality of locations and times at which a user of a mobile radio terminal accesses a client application; generating a profile of the user's behavior and preferences based on the plurality of locations and times at which the user of the mobile radio terminal accesses the client application; modifying a display of the client application based on the profile of the user's behavior and preferences.

In certain embodiments, a method for prioritizing the transmission of content to a client device based on the time and location at which a user accesses a client application is disclosed comprising the steps of: determining a plurality of locations and times at which a user of a mobile radio terminal accesses a client application; generating a profile of the user's behavior and preferences based on the plurality of locations and times at which the user of the mobile radio terminal accesses the client application; modifying a display of the client application based on the profile of the user's behavior and preferences.

In certain embodiments, a method for transmitting multiple pages in smaller units from a server to a client application in response to a single request is disclosed, the method comprising the steps of receiving a request for a plurality of pages; transmitting the request to a server; receiving the plurality of pages from the server; and generating a response including the plurality of pages, wherein the plurality of pages are separated into smaller units for transmission to a client device.

In certain embodiments, a method for a proxy to make a single request to a server to generate multiple pages wherein those pages are subsequently downloaded and cached by the proxy is disclosed comprising the steps of: receiving a request for a plurality of pages; transmitting the request to a server; receiving a data transmission from the server, said data transmission including ones of the plurality of pages from the server and instructions regarding retrieval of other ones of the plurality of pages; and generating a response including the ones of the plurality of pages, wherein the plurality of pages are separated into smaller units for transmission to a client device.

In certain embodiments, a method of providing applications style functionality to a user of a mobile radio terminal is disclosed, comprising the steps of: means for receiving a data stream transmission having a plurality of states, wherein each state is associated with output instructions and storage instructions, and wherein the plurality of states is configured such that moving through the states creates the appearance of executing an application on the mobile radio terminal; means for decoding the data stream transmission and caching each of the plurality of states with the associated output instructions according to the associated storage instructions; means for rendering a first state; responsive to an event on the mobile radio terminal, moving from the first state to a second state by applying the output instructions associated with the second state; and means for communicating a change of state to a server.

In certain embodiments, a method of transmitting data to a mobile radio terminal is disclosed comprising the steps of: means for interpreting the execution of an application such that the application can be expressed as a plurality of linked states through which a mobile radio terminal can navigate to create the appearance of executing the application; means for encoding a first data stream having ones of the plurality of linked states, wherein each state is associated with output instructions and storage instructions; means for transmitting the first data stream to at least one mobile radio terminal; and means for maintaining a record of the ones of the plurality of linked states that were transmitted to the at least one mobile radio terminal in the first data stream. In certain aspects, that method may further comprise the steps of: means for receiving changes in state of the at least one mobile radio terminal; and anticipating future state changes of the at least one mobile radio terminal to encode additional ones of the plurality of linked states into a second data stream.

In certain embodiments, a method of transmitting data to a mobile radio terminal is disclosed comprising the steps of: means for providing a current impression having a first set of screen elements; means for building an index of a plurality of impressions, wherein each of the plurality of impressions includes a set of screen elements; mean for selecting ones of the plurality of impressions that have a set of screen elements that are the most similar to the first set of screen elements of the current impression; means for comparing each set of screen elements of the selected impressions with the first set of screen elements to determine a best fit impression; means for generating a data transmission that comprises a set of differences between the best fit impression and the current impression; and means for transmitting the data transmission to a mobile radio terminal.

In certain embodiments, a method of transmitting data to a mobile radio terminal is disclosed comprising the steps of: means for storing a set of character images; means for providing the set of character images to a mobile radio terminal; means for generating a data transmission from a web page according to the set of character images such that the web page can be reconstructed from references to the set of character images; means for transmitting the data transmission to the mobile radio terminal.

In certain embodiments, a method of transmitting data to a mobile radio terminal is disclosed comprising the steps of means for transmitting a first state to the mobile radio terminal, wherein the first state includes a state transition table; means for determining an order of transmission of a plurality of states based on the state transition table of the first state; means for transmitting a second state to the mobile radio terminal according to the order of transmission without receiving a request from the mobile radio terminal.

In certain embodiments, a method of transmitting data to a mobile radio terminal is disclosed comprising the steps of: means for determining a variability of each of a plurality of elements of a first screen in an application; means for identifying a first set of areas of the first screen that can be repeated across a plurality of other screens based on the variability of the plurality of elements of the first screen; means for transmitting data representing the first screen to at least one mobile radio terminal; and means for transmitting data representing the first set of areas of the first screen to at least one mobile radio terminal such that the at least one mobile radio terminal can reuse the first set of areas for other screens.

In certain embodiments, a method for managing changes to a screen over time so that transmitting of changes to a mobile radio terminal is minimized, the method comprising the steps of: means for comparing a plurality of versions of a page to determine whether portions of the page have changed; means for comparing a plurality of defined non-static sections of the page to determine if at least one of the non-static sections of the page has changed; means for selecting ones of the plurality of defined non-static portions of the page that have changed; and means for transmitting the selected ones of the plurality of defined non-static portions of the page to at least one mobile radio terminal.

In certain embodiments, a method for managing content in a cache for transmission to a mobile radio terminal is disclosed comprising the steps of: means for defining related content in a cache, wherein the related content is expected to expire at the same time; means for defining expiry times of the related content in the cache; means for verifying a validity of the related content; means for removing the related content from the cache upon occurrence of the expiry time of the related content; and means for requesting updated content to replace the removed related content.

In certain embodiments, method for creating a personalized experience for a client application based on a time and/or location of a user is disclosed comprising the steps of: means for determining a plurality of locations and times at which a user of a mobile radio terminal accesses a client application; means for generating a profile of the user's behavior and preferences based on the plurality of locations and times at which the user of the mobile radio terminal accesses the client application; means for modifying a display of the client application based on the profile of the user's behavior and preferences.

In certain embodiments, a method for prioritizing the transmission of content to a client device based on the time and location at which a user accesses a client application is disclosed comprising the steps of: means for determining a plurality of locations and times at which a user of a mobile radio terminal accesses a client application; means for generating a profile of the user's behavior and preferences based on the plurality of locations and times at which the user of the mobile radio terminal accesses the client application; means for modifying a display of the client application based on the profile of the user's behavior and preferences.

In certain embodiments, a method for transmitting multiple pages in smaller units from a server to a client application in response to a single request is disclosed, the method comprising the steps of means for receiving a request for a plurality of pages; means for transmitting the request to a server; means for receiving the plurality of pages from the server; and means for generating a response including the plurality of pages, wherein the plurality of pages are separated into smaller units for transmission to a client device.

In certain embodiments, a method for a proxy to make a single request to a server to generate multiple pages wherein those pages are subsequently downloaded and cached by the proxy is disclosed comprising the steps of: means for receiving a request for a plurality of pages; means for transmitting the request to a server; means for receiving a data transmission from the server, said data transmission including ones of the plurality of pages from the server and instructions regarding retrieval of other ones of the plurality of pages; and means for generating a response including the ones of the plurality of pages, wherein the plurality of pages are separated into smaller units for transmission to a client device. In certain embodiments, a computer readable medium storing computer executable instructions therein for executing the methods disclosed herein.

The embodiments described herein are intended to be illustrative of the disclosed inventions. As will be recognized by those of ordinary skill in the art, various modifications and changes can be made to these embodiments and such variations and modifications would remain within the spirit and scope of the inventions defined in the appended claims and their equivalents. Additional advantages and modifications will readily occur to those of ordinary skill in the art. Therefore, the present disclosure in its broader aspects is not limited to the specific details and representative embodiments shown and described herein.

What is claimed is:

1. A method of providing applications style functionality to a user of a mobile radio terminal, comprising the steps of:
receiving a data stream transmission having a plurality of states, output instructions associated with the plurality of states, and storage instructions associated with the plurality of states, wherein the plurality of states is configured such that moving through the states creates the appearance of executing an application on the mobile radio terminal;
decoding the data stream transmission and caching each of the plurality of states with the associated output instructions according to the associated storage instructions;
rendering a first state;
responsive to an event on the mobile radio terminal, moving from the first state to a second state by applying the output instructions associated with the second state; and
communicating a change of state to a server.

2. The method of claim 1 wherein each of the plurality of states is an HTML web page, and wherein the plurality of states are linked via hypertext link.

3. The method of claim 1 wherein at least one of the plurality of states is a small section of an original screen page and at least one of the plurality of states is an adjacent area of the original screen page.

4. The method of claim 1 wherein the mobile radio terminal is a cellular telephone.

5. The method of claim 1 wherein the mobile radio terminal is a personal digital assistant.

6. The method of claim 1 wherein the server is a proxy server.

7. The method of claim 1 wherein the data stream transmission comprises user datagram protocol packets over an IP connection.

8. The method of claim 1 wherein the data stream transmission comprises transfer control protocol packets over an IP connection.

9. A method of transmitting data to a mobile radio terminal comprising the steps of:
interpreting the execution of an application such that the application is capable of being expressed as a plurality of linked states through which a mobile radio terminal can navigate to create the appearance of executing the application;
encoding a first data stream having ones of the plurality of linked states, output instructions associated with the ones of the plurality of linked states, and storage instructions associated with the ones of the plurality of linked states;
transmitting the first data stream to at least one mobile radio terminal; and
maintaining a record of the ones of the plurality of linked states that were transmitted to the at least one mobile radio terminal in the first data stream.

10. The method of claim 9 further comprising the steps of: receiving changes in state of the at least one mobile radio terminal; and anticipating future state changes of the at least one mobile radio terminal to encode additional ones of the plurality of linked states into a second data stream.

11. The method of claim 9 wherein each of the plurality of states is an HTML web page, and wherein the plurality of states are linked via hypertext links.

12. The method of claim 9 wherein at least one of the plurality of states is a section of an original screen page and at least one of the plurality of states is an adjacent area of the original screen page.

13. A non-transitory computer readable medium storing computer executable instructions therein for executing the method of claim 1.

* * * * *